US012608670B2

(12) United States Patent
    Jindal et al.

(10) Patent No.: US 12,608,670 B2
(45) Date of Patent: Apr. 21, 2026

(54) GENERATIVE BUSINESS INTELLIGENCE

(71) Applicant: TURSIO INC., Bellevue, WA (US)

(72) Inventors: Alekh Jindal, Sammamish, WA (US);
    Shi Qiao, Mercer Island, WA (US);
    Arijit Chatterjee, Kirkland, WA (US);
    Xiangyu Luo, Bellevue, WA (US)

(73) Assignee: Tursio Inc., Bellevue, WA (US)

( * ) Notice: Subject to any disclaimer, the term of this
    patent is extended or adjusted under 35
    U.S.C. 154(b) by 88 days.

(21) Appl. No.: 18/415,451

(22) Filed: Jan. 17, 2024

(65) Prior Publication Data

US 2024/0242154 A1     Jul. 18, 2024

Related U.S. Application Data

(60) Provisional application No. 63/531,882, filed on Aug.
    10, 2023, provisional application No. 63/439,337,
    filed on Jan. 17, 2023.

(51) Int. Cl.
    G06Q 10/0637         (2023.01)
(52) U.S. Cl.
    CPC ................................ G06Q 10/0637 (2013.01)
(58) Field of Classification Search
    CPC .............. G06Q 10/0637; G06Q 10/06; G06Q
        10/0635; G06Q 30/01; G06Q 30/015;
        G06N 20/00; G06F 40/30; G06F
        16/24522
    See application file for complete search history.

(56) References Cited

U.S. PATENT DOCUMENTS

| | | | | |
|---|---|---|---|---|
| 9,501,585 B1* | 11/2016 | Gautam | .............. | G06F 16/3328 |
| 2017/0060868 A1* | 3/2017 | Rais Ghasem | ....... | G06F 16/243 |
| 2020/0394190 A1* | 12/2020 | Chaudhuri | ............ | G06F 16/243 |
| 2023/0186161 A1* | 6/2023 | Arthur | .................. | G06F 40/211 |
| | | | | 704/2 |
| 2024/0242037 A1* | 7/2024 | Heller | .................... | G06F 40/35 |

FOREIGN PATENT DOCUMENTS

WO    WO-2023132834 A1 *  7/2023   ............. G06N 3/006

OTHER PUBLICATIONS

Kuchmann-Beauger, Nicolas. Question answering system in a business intelligence context. Diss. Ecole Centrale Paris, 2013. (Year: 2013).*

* cited by examiner

*Primary Examiner* — Thomas Yih Ho
(74) *Attorney, Agent, or Firm* — Anand P Narayan;
Yantra Patents LLC

(57)                  ABSTRACT
Implementations described herein relate to systems and methods to generate a response to a business intelligence question received from a user. In some implementations, a computer-implemented method may include receiving the question as a natural language string, determining one or more fragments based on the natural language string, identifying one or more query operators based on the one or more fragments, constructing a structured query tree based on the one or more query operators, executing at least a portion of the structured query tree on a data source, receiving, from the data source, an output result based on the execution, generating the response based on the output result, and providing the response to the user.

20 Claims, 17 Drawing Sheets

100

200

300

TPCH tables:

Part:

P_PARTKEY, P_NAME, P_BRAND p1, product1, brand1 p2, product2, brand1 p3, product3, brand2 p4, product4, brand3

Customer

C_CUSTKEY, C_NAME, C_NATION,

C_CITY c01, customer1, US, city1 c02, customer2, China, city2 c03, customer3, US, city3

Supplier

S_SUPPKEY, S_LOCATION, S_STATE s01, location1, state1 s02, location2, state2 s03, location3, state3

Transactions

Date, P_PARTKEY, C_CUSTKEY,

S_SUPPKEY, SALE, UNITS

2023/01/01, p1, c01, null, Sales, $1000, N/A

2023/01/02, p1, null, s01, Units, N/A, 100

FIG. 5A

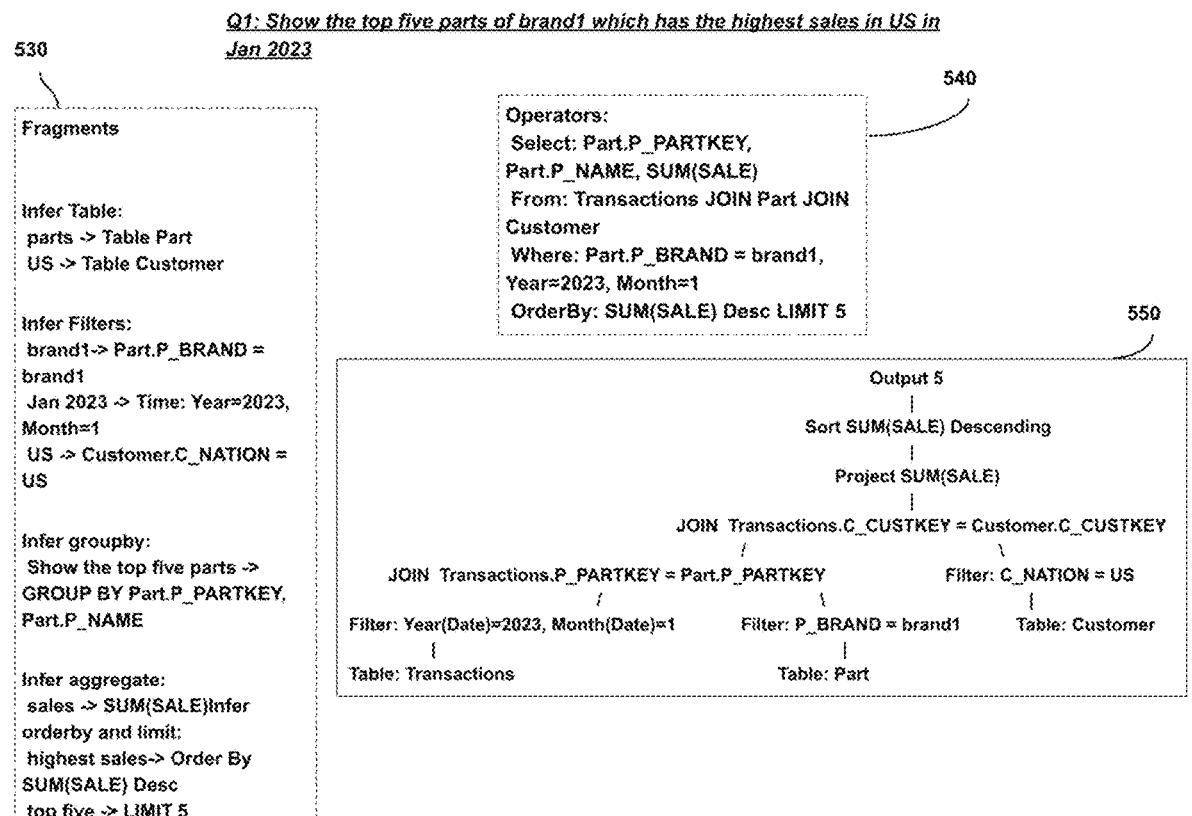

*Q1: Show the top five parts of brand1 which has the highest sales in US in Jan 2023*

530

Fragments

Infer Table:
parts -> Table Part
US -> Table Customer

Infer Filters:
brand1 -> Part.P_BRAND = brand1
Jan 2023 -> Time: Year=2023, Month=1
US -> Customer.C_NATION = US Infer groupby:
Show the top five parts ->
GROUP BY Part.P_PARTKEY, Part.P_NAME Infer aggregate:
sales -> SUM(SALE)Infer orderby and limit:
highest sales-> Order By SUM(SALE) Desc
top five -> LIMIT 5

540

Operators:
Select: Part.P_PARTKEY, Part.P_NAME, SUM(SALE)
From: Transactions JOIN Part JOIN Customer
Where: Part.P_BRAND = brand1, Year=2023, Month=1
OrderBy: SUM(SALE) Desc LIMIT 5

550

Output 5
|
Sort SUM(SALE) Descending
|
Project SUM(SALE)
|
JOIN Transactions.C_CUSTKEY = Customer.C_CUSTKEY JOIN Transactions.P_PARTKEY = Part.P_PARTKEY          Filter: C_NATION = US Filter: Year(Date)=2023, Month(Date)=1     Filter: P_BRAND = brand1     Table: Customer Table: Transactions          Table: Part

FIG. 5B

Figure 5C:
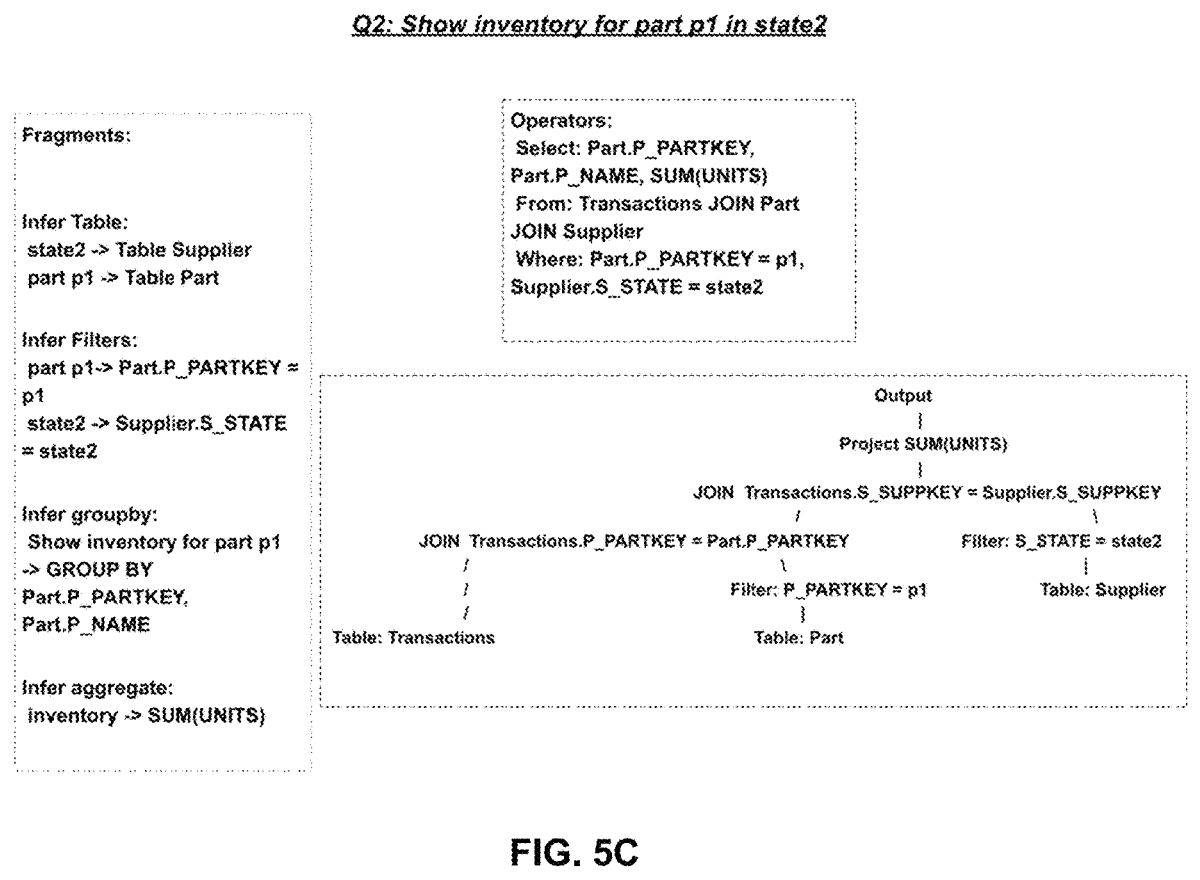

Q2: Show inventory for part p1 in state2

Fragments:

Infer Table:
state2 -> Table Supplier
part p1 -> Table Part

Infer Filters:
part p1-> Part.P_PARTKEY = p1
state2 -> Supplier.S_STATE = state2

Infer groupby:
Show inventory for part p1
-> GROUP BY
Part.P_PARTKEY,
Part.P_NAME Infer aggregate:
inventory -> SUM(UNITS)

Operators:
Select: Part.P_PARTKEY,
Part.P_NAME, SUM(UNITS)
From: Transactions JOIN Part
JOIN Supplier
Where: Part.P_PARTKEY = p1,
Supplier.S_STATE = state2

Output
|
Project SUM(UNITS)
|
JOIN  Transactions.S_SUPPKEY = Supplier.S_SUPPKEY

JOIN  Transactions.P_PARTKEY = Part.P_PARTKEY          Filter: S_STATE = state2
/                    \                          |
/                 Filter: P_PARTKEY = p1          Table: Supplier
/                        |
Table: Transactions              Table: Part

Obtain results from query execution 710

Perform formatting of tabular results 720

Infer one or more visualizations 730

Detect anomalies 740

Detect and present forecasts for time varying measures 750

Generate reports in natural language format 760

SQL + Code Generation                                    DAG Generation

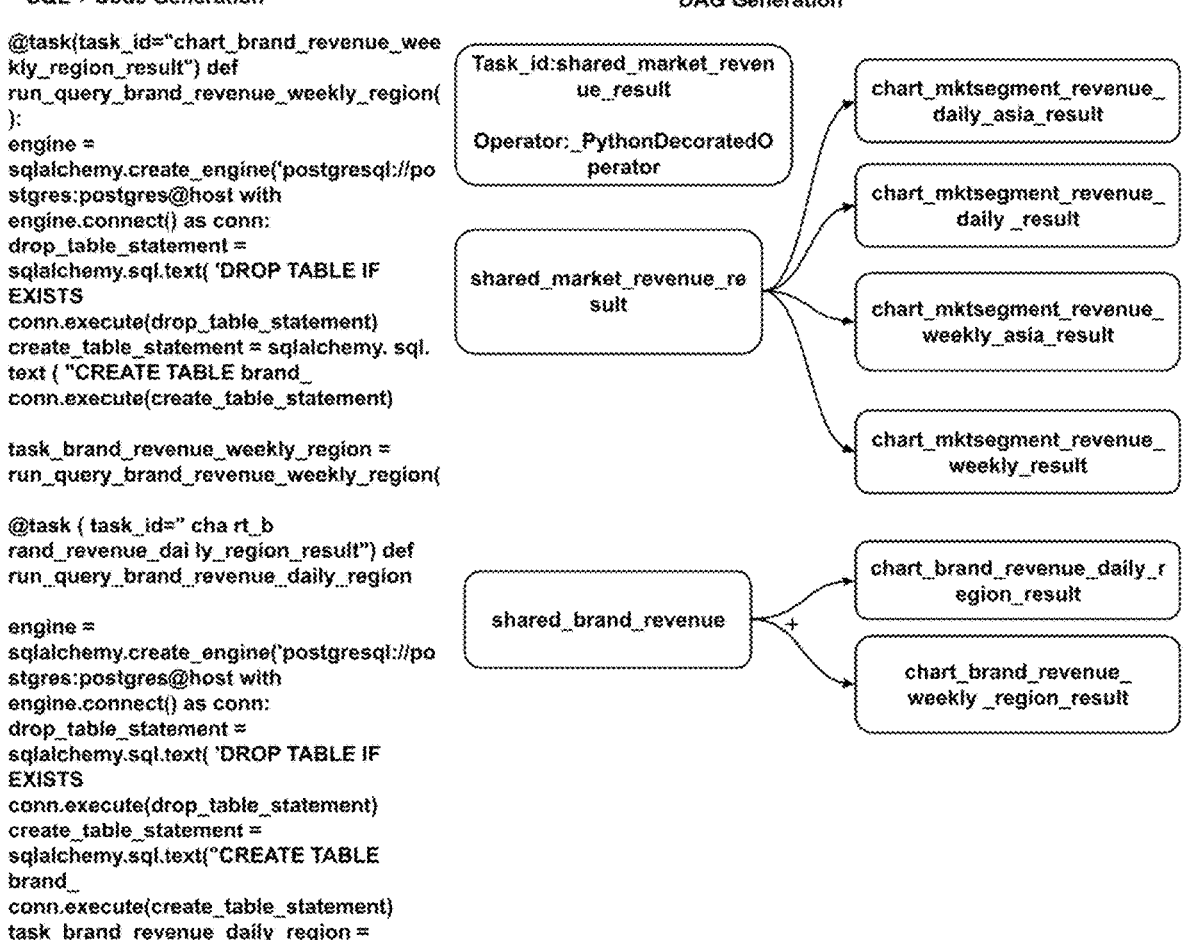

```
@task(task_id="chart_brand_revenue_wee
kly_region_result") def
run_query_brand_revenue_weekly_region(
):
engine =
sqlalchemy.create_engine('postgresql://po
stgres:postgres@host with
engine.connect() as conn:
drop_table_statement =
sqlalchemy.sql.text( 'DROP TABLE IF
EXISTS
conn.execute(drop_table_statement)
create_table_statement = sqlalchemy. sql.
text ( "CREATE TABLE brand_
conn.execute(create_table_statement)

task_brand_revenue_weekly_region =
run_query_brand_revenue_weekly_region(

@task ( task_id=" cha rt_b
rand_revenue_dai ly_region_result") def
run_query_brand_revenue_daily_region engine =
sqlalchemy.create_engine('postgresql://po
stgres:postgres@host with
engine.connect() as conn:
drop_table_statement =
sqlalchemy.sql.text( 'DROP TABLE IF
EXISTS
conn.execute(drop_table_statement)
create_table_statement =
sqlalchemy.sql.text("CREATE TABLE
brand_
conn.execute(create_table_statement)
task_brand_revenue_daily_region =
run_query_brand_revenue_daily_region()
```

FIG. 9

GENERATIVE BUSINESS INTELLIGENCE

CROSS-REFERENCE TO RELATED APPLICATIONS

This application claims priority to U.S. Provisional Patent Application No. 63/439,337 filed 17 Jan. 2023, titled "Automatic generation of business intelligence applications and dashboards" and claims priority to U.S. Provisional Patent Application No. 63/531,882 filed 10 Aug. 2023, titled "Database Driven Generative Artificial Intelligence" which are incorporated by reference herein in their entirety.

TECHNICAL FIELD

Embodiments relate generally to business intelligence, and specifically to artificial intelligence based business intelligence applications.

BACKGROUND

Business intelligence refers to the use of data for decision making. Early instances of business intelligence applications date back to 1865 when a banker received and acted on information about battles fought, to gain profits. The term business intelligence came into more formal existence in 1989 when it was described as "a set of concepts and methods to improve business decision making by using fact-based support systems." Business intelligence gained more popularity in the late 90s and over time it is considered to include reporting, dashboarding, online analytical processing, data mining, alerting, benchmarking, predictive analytics, prescriptive analytics, business analytics, etc.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving the question as a natural language string. The receiving also includes determining one or more fragments based on the natural language string; identifying one or more query operators based on the one or more fragments; constructing a structured query tree based on the one or more query operators; executing at least a portion of the structured query tree on a data source; receiving, from the data source, an output result based on the execution; generating the response based on the output result; and providing the response to the user. Other embodiments of this aspect include corresponding computer systems, apparatus, and computer programs recorded on one or more computer storage devices, each configured to perform the actions of the methods.

Implementations may include one or more of the following features. The computer-implemented method where determining the one or more fragments may include at least applying a large language model to the natural language string. Determining the one or more fragments further may include providing synthetic questions that are similar to the natural language string to the large language model. Identifying the one or more query operators may include performing feature extraction on the one or more fragments.

Constructing the structured query tree based on the one or more query operators may include constructing the structured query tree based on a target data source. Executing at least the portion of the structured query tree may include performing an optimized execution of the structured query tree. The data source is a large data model generated from a primary data source. The receiving the question may include receiving the question at an artificial intelligence AI agent, where the AI agent is an instantiation of a plurality of machine learning models that are particular to a domain associated with a computing device that originated the question. Receiving the questions as the natural language string may include receiving an input via a voice to text converter. Generating the response may include inferring one or more visualization elements based on the output result. A type of visualization element is based on a cardinality of data points in the output result. The computer-implemented method may include detecting one or more anomalies in the output result. The computer-implemented method may include generating a plurality of synthetic questions for respective domains based on metadata from ontology of the domains. Generating the plurality of synthetic questions for a particular domain may include combining a plurality of fragments, where each fragment is generated based on components included in a data source associated with the particular domain. Implementations of the described techniques may include hardware, a method or process, or computer software on a computer-accessible medium.

One general aspect includes a non-transitory computer-readable medium may include instructions that. The non-transitory computer-readable medium also includes receiving a question as a natural language string; determining one or more fragments based on the natural language string; identifying one or more query operators based on the one or more fragments; constructing a structured query tree based on the one or more query operators; executing at least a portion of the structured query tree on a data source; receiving, from the data source, an output result based on the execution; generating the response based on the output result; and providing the response to a user. Other embodiments of this aspect include corresponding computer systems, apparatus, and computer programs recorded on one or more computer storage devices, each configured to perform the actions of the methods.

Implementations may include one or more of the following features. The non-transitory computer-readable medium where determining the one or more fragments may include at least applying a large language model to the natural language string. Determining the one or more fragments further may include providing synthetic questions that are similar to the natural language string to the large language model. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving a question as a natural language string; determining one or more fragments based on the natural language string; identifying one or more query operators based on the one or more fragments; constructing a structured query tree based on the one or more query operators; executing at least a portion of the structured query tree on a data source; receiving, from the data source, an output result based on the execution; generating the response based on the output result; and providing the response to a user. Other embodiments of this aspect include corresponding computer systems, apparatus, and computer programs recorded on one or more computer storage devices, each configured to perform the actions of the methods.

Implementations may include one or more of the following features. The system where the receiving the question may include receiving the question at an artificial intelligence AI agent, where the AI agent is an instantiation of a plurality of machine learning models that are particular to a domain associated with a computing device that originated the question. Identifying the one or more query operators may include performing feature extraction on the one or more fragments. Implementations of the described techniques may include hardware, a method or process, or computer software on a computer-accessible medium.

BRIEF DESCRIPTION OF THE DRAWINGS

FIG. 5A depicts example elements of stored business data at a data source, in accordance with some embodiments.

FIG. 5B depicts an example business intelligence question and corresponding fragments, operators, and a structured query tree, in accordance with some embodiments.

FIG. 5C depicts another example business intelligence question and corresponding fragments, operators, and a structured query tree, in accordance with some embodiments.

FIG. 9 depicts example code generation, in accordance with some embodiments.

DETAILED DESCRIPTION

Figure 1A:
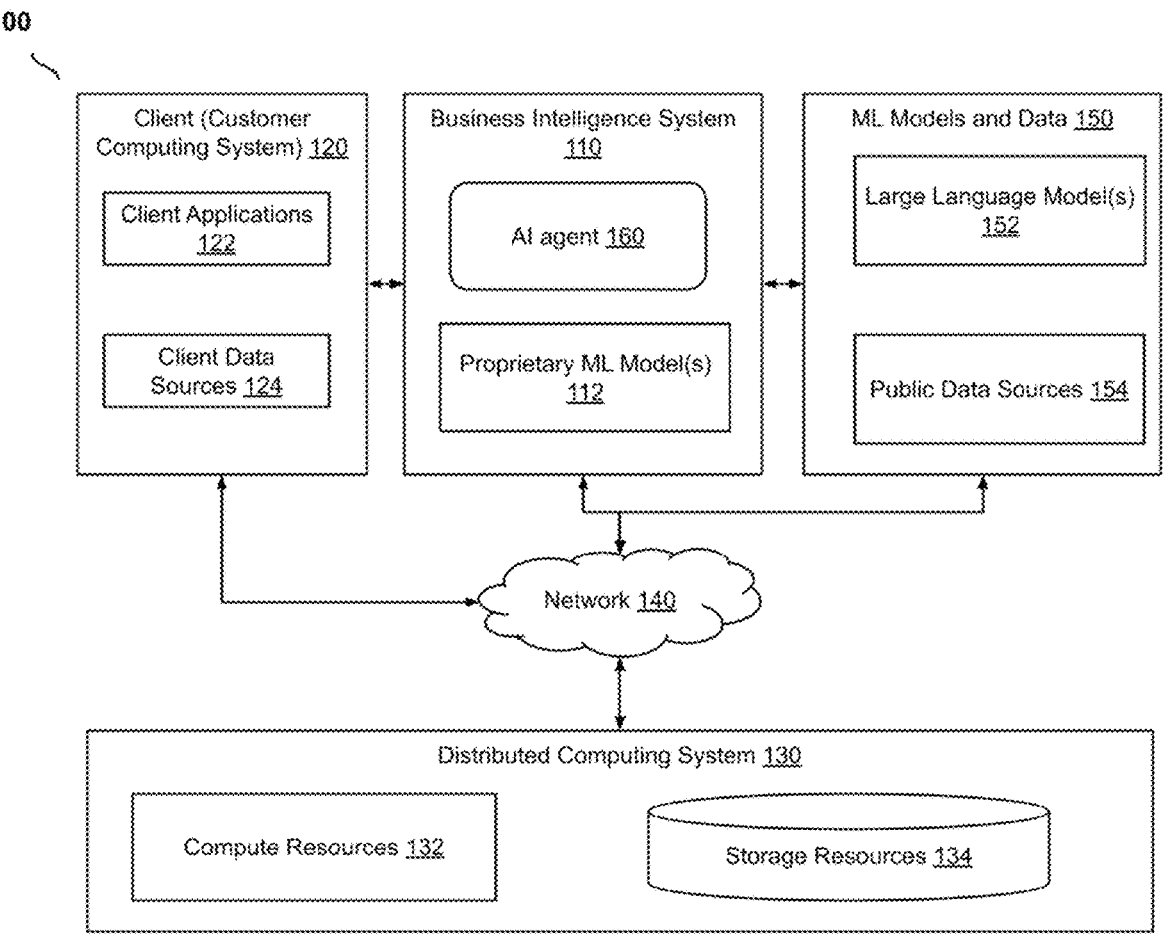
FIG. 1A depicts a system environment utilized for business intelligence applications, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc., indicate that the embodiment described may include a particular feature, structure, or characteristic, but every embodiment may not necessarily include the particular feature, structure, or characteristic. Similarly, references in the specification to "some implementations", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same embodiment or implementation. Further, when a particular feature, structure, or characteristic is described in connection with an embodiment, such feature, structure, or characteristic may be implemented in connection with other embodiments whether or not explicitly described.

This disclosure is related to the technical problem of generation and reporting of business intelligence. The following stages in the evolution of business intelligence may be observed.

Business Intelligence 1.0—Self-Manage

Traditionally, business intelligence included a combination of data gathering, data storage and knowledge management. As a result, in the late 90s and early 2000s, the traditional business intelligence approach was driven by IT organizations via static reports and longer follow-ups cycles that involved tedious queues and processes. This was frustrating with people unable to use the latest data for making decisions. This era where data was siloed, formulating, and delivering reports to decision makers was time taking, and only technical experts were able to leverage advanced data analysis software is also referred to as Business Intelligence 1.0.

Business Intelligence 2.0—Self-Serve

Business intelligence 1.0 was self-managed since it required an in-house team of experts who took care of managing the data and delivering reports. However, with the growth of internet and business connectivity, and the democratization of resources with cloud and accessibility with mobile made business intelligence essential for every business and every person in a real-time manner. Business intelligence 2.0 was popularized in the mid 2000s and 2010s, inspired by new trends such as web 2.0 and social. The promise was to decentralize decisions and facts, with more collaboration, linking, detection, monitoring, visualization, ease-of-use, action via a streamlined operational knowledge for collective knowledge. Business intelligence 2.0 is self-serve in nature, i.e., even though IT can manage and govern data access, many more people in the organization are empowered to prepare data, run analysis, and discover insights via visual exploration. The goal is to simplify the processes and make BI more accessible. Examples of self-service BI tools include Microsoft Power BI, Salesforce Tableau, Google Looker and Data Studio, IBM Cognos, Amazon QuickSight, Thoughtspot, SAP BusinessObjects, Mode Analytics, HEX technologies, JetBrains Datalore, Elastic Kibana, Apache Superset, Databricks Notebook Dashboards, Snowflake Dashboards, Sigma Computing, Omni Analytics, and others.

Business intelligence 2.0 introduced self-serve tools for real-time access, but those tools are turning out to be insufficient for the future. There are different sets of challenges that have emerged.

Firstly, learning the BI tool can prove to be a challenge since it often involves custom languages such as LookML in Looker or Data Analysis Expressions in Power BI. Or custom engines and processes such as in-memory VertiPaq storage in Power BI, extracts into compressed in-memory representation in Tableau, and persistent derived tables (PDTs) in Looker. Users need to figure out a lot of details such as connecting, scheduling, refreshing, and visualization in their BI tool. Overall, there is a learning curve ranging from weeks to months involved.

Secondly, BI users spend a lot of time preparing their data. They need to load, clean, transform, and aggregate the data before it could be used. They need to define data models to capture the business logic, using tool specific mechanisms, such as the extracts in Tableau or PDTs in Looker, and provide them to the business users for further analysis. This whole process is time and resource intensive and is typically constrained by a centralized and small team of experts (the data engineers) to serve all business users.

Thirdly, performance and optimization can be a major struggle in business intelligence 2.0. Given that current tools are self-serve, users are responsible for optimizing dashboard load performance, scaling to larger datasets, and modifying and tuning the dashboards. They need to select the best ways to connect (direct query vs import data in Power BI or single vs multi-table extracts in Tableau), refresh (incremental vs full, number of refreshes, refresh columns, etc.), and write models that generate efficient queries in the backend. BI users end up doing all these optimization tasks manually, taking anyways from months to a year in refining a dashboard.

Finally, productivity and costs are majorly impacted. Long learning curves, data preparation efforts, and performance and optimization cycles mean that business insights are too costly to produce and take too long to act upon. It can take up long (and expensive) consulting time with experts, and the whole process is inefficient to collaborate or share with others. Consequently, organizations are bottlenecked by resources in making good use of business intelligence.

The above problems in business intelligence 2.0 are all rooted in the fact that today's data and app platforms are siloed—they are built separately by different sets of people having very different skills and mindsets. Data platforms have done a great job in handling scale and efficiency on cloud environments, while app platforms have done a great job of capturing the business logic and business models and providing the ease of use needed for the end users. However, given the silo between them, data and apps are neither aware nor optimized for each other. Current efforts to bridge this gap have either resulted in specific data platforms providing more visualization and workflow capabilities while still missing the generality and business logic that apps need, or the app platforms creating their own mini engines to store and process data while still missing the scale and efficiency that is native to data platforms.

Business intelligence is the use of data for decision making. The traditional approach for business intelligence is to get the business requirements, prepare the data models, and finally create dashboards for the end users.

Implementing business intelligence (BI) processes comes with several notable challenges. Initially, there's a significant amount of preparatory work required, as data must be transformed before any dashboards can be developed. This task is further complicated by the need to move data, as most BI tools require extracting data to build data models. This process demands the expertise of domain specialists who can effectively translate business requirements into functional data models.

Moreover, maintaining these data transformations is a tedious and ongoing task. The time investment for typical BI projects is substantial, often extending into weeks or months before any actionable insights can be derived. Additionally, the process involves manual labor, which not only adds to the expense but also increases the risk of errors.

A common outcome of this process is the proliferation of dashboards. Users often find themselves with an excessive number of dashboards, each tailored to a specific scenario. The creation of new dashboards demands considerable time and effort, further complicating the process and adding to its challenges.

Techniques of this disclosure may be utilized to automatically process natural language strings and perform complex data source operations, e.g., execute query operators, etc.

The present disclosure relates to a computer-implemented method designed to efficiently and accurately generate responses to business intelligence questions posed by users. This method is particularly focused on handling and processing questions received in natural language form. Upon receiving a question, the business intelligence system first interprets the query as a natural language string, breaking it down into manageable fragments. The interpretation is mediated by domain knowledge that is encapsulated in synthetic questions that are generated offline through a training process. These fragments are then analyzed to identify relevant query operators, which are integral to understanding the intent and requirements of the original question.

Following this, a structured query tree is constructed utilizing the identified query operators. This tree serves as a blueprint for querying a data source, allowing for a systematic and logical approach to data retrieval from the data source. The system then executes at least a portion of this structured query tree on the chosen data source, ensuring that accurate information is extracted based on the user's query.

Subsequently, the system receives an output result from the data source, which is directly based on the executed query tree. This output result includes the essential data or information pertinent to the user's original business intelligence question. The final step involves the system generating a response based on the output result. This response is tailored to accurately and comprehensively address the user's query, translating the complex data output into an understandable format.

Finally, this generated response is provided back to the user, completing the cycle of question and response. This method significantly enhances the efficiency and accuracy of responding to business intelligence questions, especially those posed in natural language, and is adaptable to various data sources and business environments. This approach offers a technical solution to the problem of processing natural language strings that are directed to a data source, and provides accurate results when compared to one-shot techniques. Determining fragments based on previously generated synthetic questions and eventually, the query operators, provides a technical advantage in that any interpretation of the natural language string is guaranteed to resolve into objects, e.g., entities, attributes, measures, etc., that are guaranteed to be included in the data source.

Some previous approaches have described processing an entire question and generating query operators, e.g., SQL queries. This can lead to erroneous translation, and to the generation of invalid query trees. A fragment based approach, as described herein represents a bottoms up approach, whereby fragments are formed first and subsequently mapped to query operators and query trees. The approach described herein provides more accurate results and to queries that are always valid. This can lead to faster computational times, reduced resource use, and to more accurate end results and business intelligence results and/or insights.

A database dimension may refer to a group of related elements, known as attributes, which are used to enrich the information about factual data in one or several data cubes. In a product dimension, for instance, these attributes could include the product's name, category, line, size, and price.

Database entity in a database represents an item (such as a person, place, object, or any specific item) for which data is collected and stored. This data is represented through properties, and optionally, workflows and tables. Properties are essential for an entity, as an entity is not considered complete without them.

A database measure is a numerical attribute in your data, which can be analyzed using one or more dimensions. Measures are the elements in a database that hold numerical values, allowing for calculations and aggregations like sums, averages, or standard deviations. They are inherently quantitative and used for numerical analysis.

Database functions are mechanisms to enhance the capabilities of a database server. A Database function is a routine that takes in parameters, executes an action (such as a complex calculation), and returns the result of that action. They are essential for performing specialized tasks within the database.

FIG. 1A depicts a system environment utilized for business intelligence applications, in accordance with some implementations.

As depicted in FIG. 1A, a business intelligence system 110 includes an AI agent 160 and proprietary machine learning (ML) models. The business intelligence system 110 is connected via network 140 to client computing system 120, to public ML models/Data 150, and to distributed computing system 130.

The client computing system 120 may include client applications 122 that may be installed on user devices, computer devices, etc., as well as client data sources 124.

The distributed computing system 130 may be utilized to perform various business intelligence tasks and may include both compute resources 132 and storage resources 134.

The ML models and Data 150 may include large language model(s) 152 and public data sources 154.

Figure 1B:
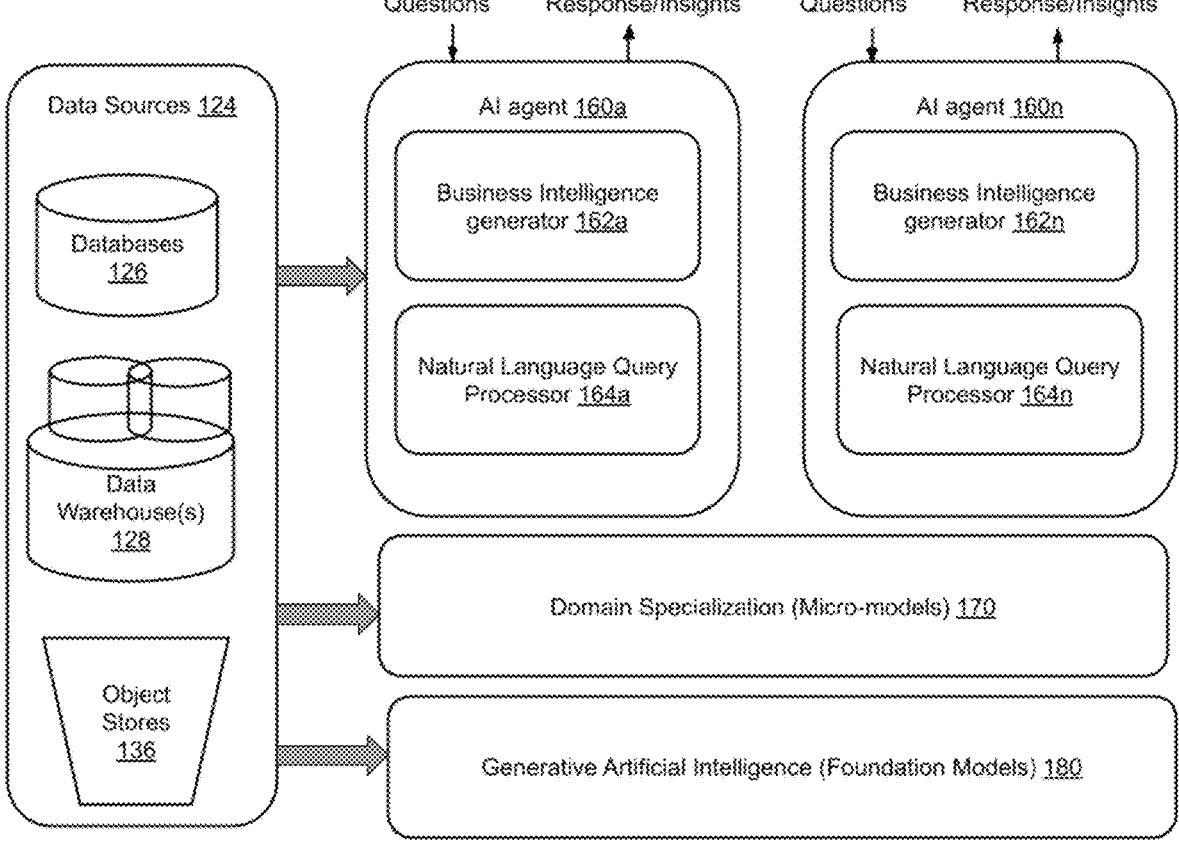
FIG. 1B depicts an example system architecture to implement artificial intelligence powered business intelligence applications, in accordance with some implementations.

FIG. 1B depicts an example system architecture to implement artificial intelligence powered business intelligence applications, in accordance with some implementations.

Per techniques of this disclosure, domain-specific artificial intelligence (AI) agents are utilized to address business inquiries and/or questions. This is achieved by adapting foundational generative AI models, both for data and language, into specialized micro-models tailored to various business sectors such as retail, manufacturing, banking, consumer goods, etc. These micro-models are employed to create AI agents capable of directly extracting answers from diverse data sources. The approach offers several advantages, including keeping data at its source without the need for updates, automating manual data transformations within the domain-specific adaptations, integrating business context into the AI agent, allowing business users to query in their context, scaling with minimal effort to accommodate numerous questions and stakeholders, and eliminating the creation of superfluous dashboards, thus focusing on generating only essential reports.

The business intelligence system utilizes generative business intelligence, and includes key components, e.g., domain specialization, natural language query processor, and a business intelligence generator.

As depicted in FIG. 1B, data sources 124 can include databases 126, data warehouses 128, and object stores 136.

Each AI agent 160 may include a business intelligence generator 162 and a natural language query (question) processor 164. Each AI agent is customized for a particular domain and/or client and can receive natural language questions as inputs and provide responses/insights.

The business intelligence system additionally includes and/or can access domain specialization modules (micromodels) 170 and generative artificial intelligence models (foundational models) 180, which may be generalized models that are trained over large data sets and are not specific to any particular domain.

Figure 1C:
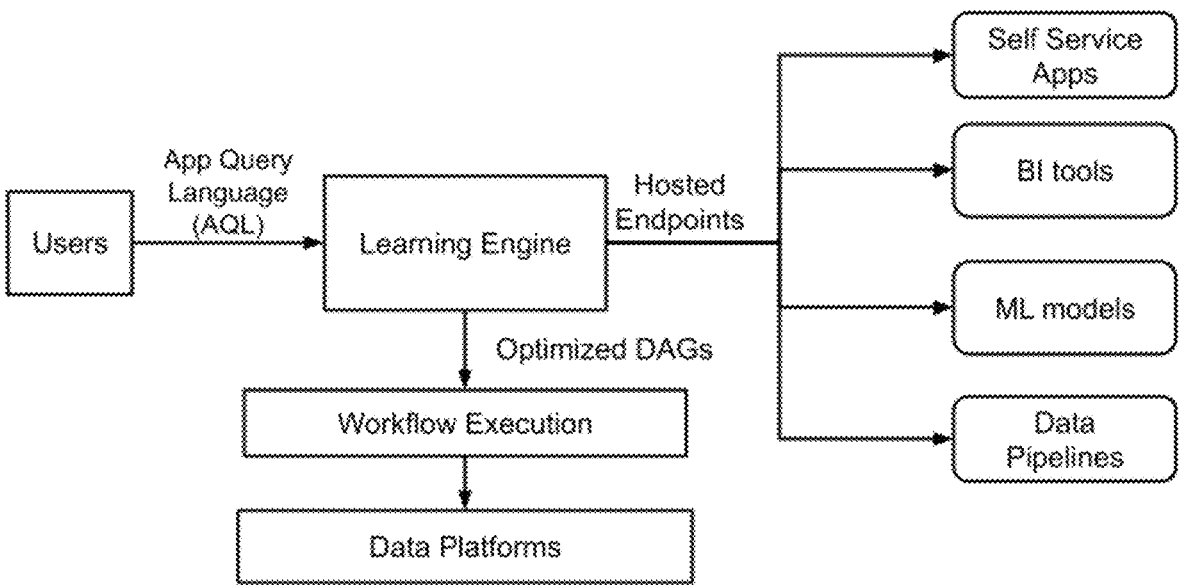
FIG. 1C depicts an example architecture for smart applications (smartapps), in accordance with some embodiments.

FIG. 1C depicts an example architecture for smart applications (smartapps), in accordance with some embodiments. Towards Business Intelligence 3.0—Self-Generate!

The next generation of businesses require data and apps to come together, for better efficiencies and productivity, in realizing the true business potential. This goes way beyond business intelligence 2.0, and the new approach needs to be AI-driven in creating a data-app flywheel for providing a smooth uninterrupted app experience for the users, while taking care of complex mechanics behind the scenes. This may be termed AI-driven approach as business intelligence 3.0 and three new concepts may be introduced to characterize it:

1. Conversational. Business intelligence tools need to be conversational, where users can ask their business questions more naturally based on their context. Users focus on what they want and not how they are going to get it, thus eliminating the barriers for anyone looking for intelligence from a given corporate data.

2. Generative. Business intelligence tools need to generate all complex mechanics behind the scenes, the 'how' part. These include generating enriched conversations, backend workflows, data preparation, optimizations, recommendations, automations, visualizations, end points, and even the semantic meaning to connect data with business questions.

3. Managed: Business intelligence tools need to be fully managed SaaS, hosting a learning-based application environment for user interactions, backend workflows, and frontend visualizations. All this happens via an on-demand, auto scaled, and usage-based, instead of user-based, pay-as-you-go infrastructure.

Business intelligence 3.0 makes the shift from self-serve to self-generate, i.e., BI users are not fighting the tools to self-serve their business needs. Instead, they specify their business needs declaratively, and cause the system to self-generate all related processes and mechanics that are needed to address those needs.

Advantages and ROI

Productivity. Business intelligence 3.0 will dramatically reduce the time to transform business data into intelligence.

The generative approach will help create new dashboards in minutes compared to days, boosting productivity by factors of up to 200 (200×).

Performance. By removing the silos between app and data, business intelligence 3.0 generates the most efficient backend workflows that bring down dashboard load times from minutes to seconds, bringing in a speed up of 20×!

Cost. By focusing on declarative business needs, business intelligence 3.0 generates smart automations and end-to-end optimizations to bring down the overall. This coupled with usage-based pricing reduces the cost of both app platforms by a factor of 4(4×) and data platforms by a factor of 2(2×).

Figure 1D:
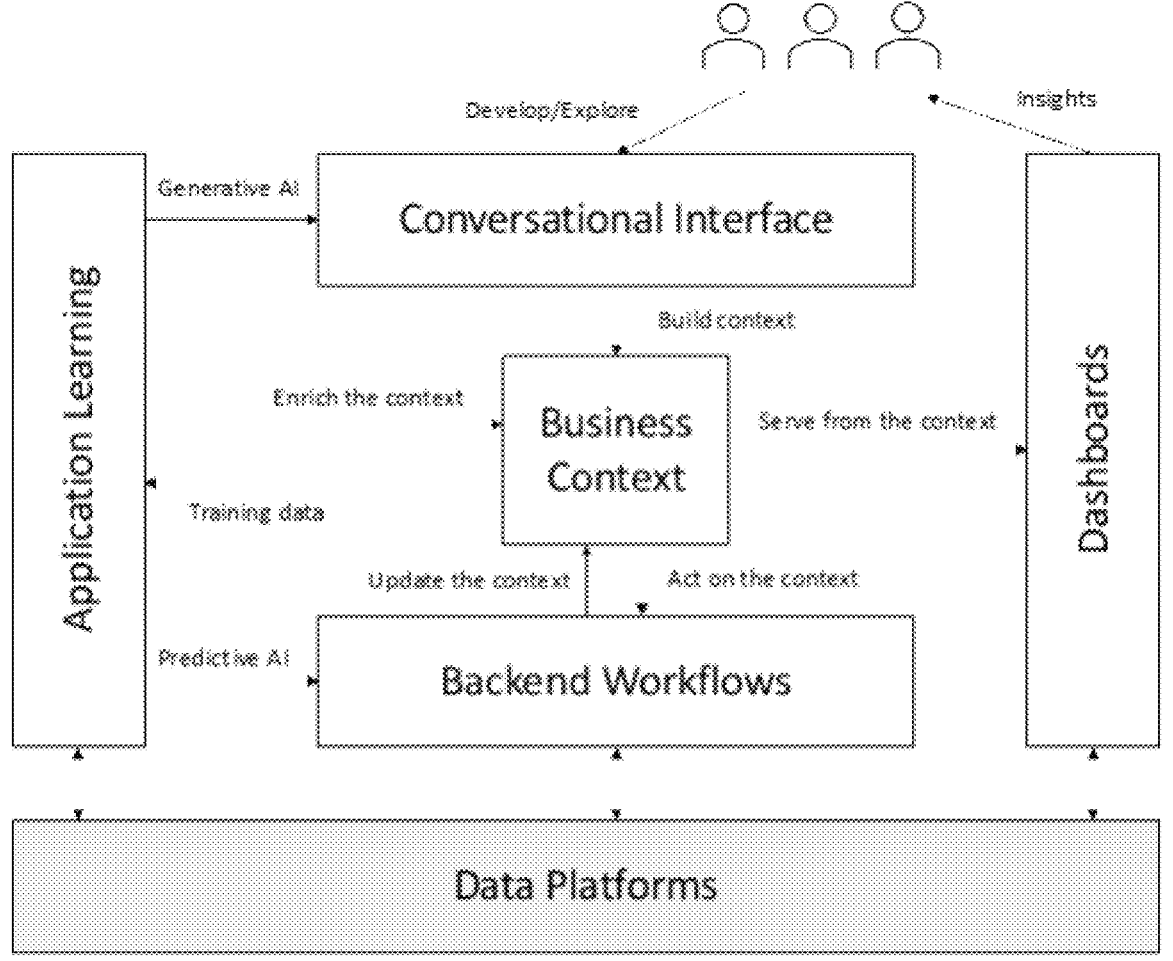
FIG. 1D depicts an example architecture for business intelligence 3.0, in accordance with some embodiments.

FIG. 1D depicts an example architecture for business intelligence 3.0, in accordance with some embodiments.

As depicted in FIG. 1D, several operations may be involved.

First, a conversational interface helps users build their business context, which could include queries, metadata, semantic meanings, aggregated or sampled data, and any other pieces of information that could help interpret or augment business questions and provide one or more artifacts to answer them. Users could include data engineers and data analysts for building the workflows, data scientists for exploration and analysis, business analysts for gathering business insights based on their domain expertise, and executives or super users for digesting and acting on the output business intelligence.

The context then generates and triggers backend workflows on top of the underlying data platforms. These workflows run all necessary background processing to provide instant, scheduled, or predicted responses to business questions.

Backend workflows in turn update the business context. These could include training models, generating aggregates, or any other artifacts in response to users' business questions. These updates could be one-off, multiple times, periodic, or async on-demand.

The business context also generates dashboards for the users. Dashboards are hosted on web endpoints, with efficient in-memory data access, and can be shared with anyone. Dashboards can contain a variety of charts, each with filters on one or more columns. The generated dashboards can also pick up data points directly from the data platforms.

An application learning process uses the business context as training data for learning models. These models could be used to enrich the business context, e.g., generate better (more efficient, productive, useful, etc.) backend workloads or generate better dashboards.

Application learning can also improve the conversations in the conversational interface by producing interactions that can help users answer their business questions better, e.g., by generating queries or semantics from natural language with minimal user input.

Application learning can also improve backend workflows by predictively tuning them based on historical experience, e.g., compacting, pruning, pushing down, optimizing, scheduling, resourcing, or tuning in smarter ways.

Application learning can also leverage data from the underlying data platforms to learn how the application can work better.

Note that even though business intelligence 3.0 can work with any underlying data platform, it is aware of and is optimized for the underlying data platforms by generating tailored workflows that can scale and run efficiently on those data platforms. Furthermore, both the app learning and the generated dashboards could be aware of the underlying data platforms.

Three key concepts of business intelligence 3.0 architecture, namely conversational, generative, and managed, are described herein.

Conversational

Business intelligence 3.0 is conversational. Instead of forcing users to learn complex front-end tools and mechanics, the entire experience with business intelligence 3.0 is driven by interactive conversations where users specify what they want, and all mechanics are generated by the system. To facilitate this interface, the business intelligence system may support a combination of SQL-like language, Python imperative language for richer expressions, natural language constructs, and interactive augmentations. We describe each of these below.

App Query Language

App query language (AQL) is a structured query language for building applications in a BI 3.0 system. Key innovations in AQL include:

1. Traditional SQL queries over any of the backend data platforms.
2. Assignment of SQL queries to variables or models.
3. SQL variables or models could be referenced in other models.
4. Model definitions are always persisted and transactionally consistent.
5. SQL entities for dashboards (and other application types) with transactional semantics.
6. Declarative statements for creating, updating, and deleting dashboards (lifecycle).
7. Declaratively inserting charts with specifications into dashboards.
8. Declaratively previewing, deploying, and maintaining the dashboard lifecycle.

Note that AQL is extensible to other application types, other than dashboards. Examples include data preparation or ETL, data science, machine learning, predictive analytics, MLOps, and DataOps. In each of these cases, AQL creates SQL entities that provide a clean and efficient abstraction for application building.

Python Language

Python has become the de facto language for a large body of data scientists and analysts for doing data science and machine learning. This is coupled with the presence of a large number of libraries and tools for model training and inference. Business intelligence 3.0 provides native support for Python. Like SQL models, users can define Python models by providing functions. These functions could be in-lined or provided in separate script files. The output of these functions or scripts is expected to be a Pandas Dataframe and assigned to a variable, as follows:

$$df1 = \text{<Python Function/Script>}$$

Users can perform any custom processing, e.g., data science, model training, etc., in their Python functions and scripts. Like SQL models, the output Python model definitions are persisted and could be referenced in other models. Furthermore, Python models can be converted into SQL models and vice versa, using toPandas( ) and toSql( ) methods respectively. This interoperability makes business intelligence 3.0 accessible to data scientists building modern business intelligence apps with predictive analytics.

Natural Language

In addition to AQL and Python, business intelligence 3.0 also supports interactions in natural language. This allows business analysts, who may not be expert in SQL or Python to still be productive and get business insights. The idea is to support two kinds of natural language tasks:

1. Creating models from natural language. Users can simply write what they want in plain statements and the system generates the best possible model, using the underlying datasets and their schemas, to represent those statements. Examples include "Annual sales in European markets", "Have students who dropped out been refunded?"

2. Explaining models into natural language. System can provide step by step explanation of what an existing model (created by SQL, Python, or natural language) is accomplishing.

Together, the above two capabilities provide a fluent interface for business analysts.

Augmentation

The conversational interface in business intelligence 3.0 further provides an augmented experience in the following ways:

First, it provides recommendations to auto-complete conversation statements, i.e., even if the users only provide part statements and are unsure about what to say next, the system can provide auto-complete recommendations. These can include completing AQL syntax, model definitions, dashboard creations, chart insertions, and even dashboard deployments in case they forget. The goal is to not have users struggle with language and syntax but to augment the conversations with appropriate auto-completions wherever needed.

Second, the system makes suggestions to the user statements and asks for feedback. For example, if the user says, "Analyze sales", the system can ask whether to analyze in "European markets" or in "Asian markets", based on the market data available in the database. Apart from models, the system can also suggest charts and visualizations that might be interesting, e.g., sales by market segment in addition to region. Users can accept one or more suggestions and discard the others. The system uses this feedback for future suggestions.

Finally, the conversational interface has automations built in. For example, in case the users do not specify dashboard freshness intervals, the system can automatically set refresh intervals based on how frequently the underlying data changes. Likewise, the system can infer dimension, measure, and filter columns and populate the dashboard with different combinations of these. The chart types (line, bar, pie) can also be inferred based on the data distributions. The system can further automate model maintenance by pre-building certain models and deleting unused ones. The goal is to not have users deal with typically mundane tasks and instead automate them.

Augmentation is the hidden system language in the conversational interface where the system takes action to help move the conversation forward.

Generative

Business intelligence 3.0 is generative, i.e., it creates all required mechanics based on the conversations with the user. This means that users only focus on what they want, and the system actively works on figuring out how it can be done. There are three types of generative actions behind the scenes, namely context generation, workflow generation, and dashboard generation. We describe each of these below.

Context Generation

Answers to business questions depend on the context and therefore business intelligence 3.0 focusses on actively building that context. The context can consist of a wide-ranging set of information, including but not limited to the following:

1. Business—what is the industry, scope, segment, and goals?
2. Data—how do the tables, schemas, databases, data flow look like?
3. Semantics—what does the data (tables, columns, relationships) mean?
4. Models—what are the derived entities of relevance?
5. Metrics—what do users care about for impact?
6. Insights—what kind of end results are they looking for?

The context can be enriched based on how it changes over time or based on how other similar contexts have developed. For example, businesses in similar industries may have similar metrics of interest. Or tables with similar names could mean similar things. Or metrics determine the kind of insights a business user might be looking for. Therefore, the context could be thought of as a characterization of the business setting that is looking for intelligence. It is continually built and persisted across all users in the same workspace. As a result, new users do not have to start from scratch. In fact, the conversational interface allows new users to get explanations about the context, e.g., explain existing models. Users can still explicitly refresh the context in case of major events.

Workflow Generation

Business intelligence 2.0 tools query the backend data platforms to fetch the data for their dashboards. This can get terribly slow when scaling to large datasets. More advanced tools like Power BI and Tableau, allows users to import their data into a custom engine for data preparation. However, these custom engines are not built for scale. Therefore, the typical practice is for users to run offline ETL pipelines that do the heavy lifting and generate smaller pre-aggregated data for the dashboards. This is time taking and cumbersome and creating long painful dependencies between data engineers and data analysts.

Business intelligence 3.0 turns the problem of data preparation upside down. Instead of expecting users to prepare their data before they start working on business intelligence, BI 3.0 system automatically generates data preparation workflows in response to what the analyst wants to accomplish. Specifically, when a user creates a dashboard using AQL, the system collects all models that are used to display charts on that dashboard. Those models are then stitched into an Airflow (or other workflow) job and scheduled to run based on freshness requirements. The generated workflows are automatically updated whenever the dashboard is updated. By considering what needs to be surfaced and pre-computing that in scheduled workflows ensures that aggregated data is always available for interactive performance. Therefore, dashboards in BI 3.0 never touch the raw data directly—a major change from prior approaches—providing lightning fast performance and significantly less computation costs incurred on the data platforms.

Thus, automatic workflow generation redefines the business intelligence in the following ways:

1. Dashboard data is kept always aggregated
2. Only perform the computations that are really needed
3. Users do not have to worry about writing any of the tedious workflows
4. All charts are loaded instantly since they only read the aggregated data
5. Much less backend costs since no real time queries are sent to the backends
6. Well defined workflows that are easy to understand and debug
7. Better monitoring and open-source standards Dashboard Generation Business intelligence 2.0 requires learning specific tools to create the dashboards, involving a lot of manual effort in creating, tuning, and refining those dashboards. But more importantly the dashboard building process is totally separate from the rest of the code development process. In fact, it is an ad-hoc process that can easily lead to numerous dashboards being created with little tracking, review, or maintenance.

Declarative dashboards. The goal of business intelligence 3.0 is to change the above situation via declarative dashboard generation, where users only say what they want, without worrying about creating beautiful aesthetics or about various charting options. As a result, users don't need to be expert at graphic libraries or visualization techniques. Nor do they need to spend time on positioning and tuning their charts. They just need to work on the specification of their dashboards and let the system create great looking dashboards in a predictable and consistent manner.

Dashboard as SQL object. Dashboards in business intelligence 3.0 are well defined SQL objects that are managed via typical DDL statements, and mutable via typical DML statements. Thus, dashboards have transactional semantics, ACID properties, recovery log, providing a better way to manage dashboards, including easier to manage their lifecycle, easier to track and purge, and better fine-grained access control. This also provides a better abstraction to separate dashboard declaration and definition, making it easier to change the dashboard implementation anytime and automatically reflect that to all existing dashboards. The system could also pick different implementations for different dashboards, based on user, requirements, data, etc.

Dashboard as code. Business intelligence 3.0 makes the dashboard part of the code, i.e., they can be programmatically created and maintained just like any other piece of code. This means that dashboards can have commits, version control, code reviews, unit testing CI/CD, etc. just like the rest of the code development. All of these makes business intelligence developer friendly bringing in modern well-crafted software engineering practices to dashboard development as well.

Business intelligence 3.0 has a managed deployment that is scalable and on-demand. The core of the deployment is an application environment, an ephemeral compute substrate that could be spun up as needed.

Figure 2A:
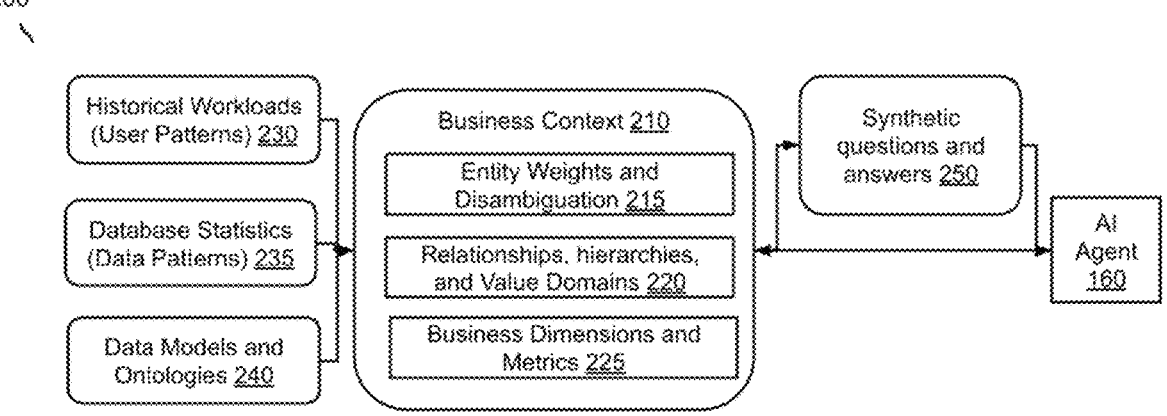
FIG. 2A illustrates an example framework for performing domain specific specialization of an artificial intelligence agent, in accordance with some embodiments.

FIG. 2A illustrates an example framework for performing domain specific specialization of an artificial intelligence agent, in accordance with some embodiments.

Business intelligence is commonly domain specific. Therefore, a generator approach may beneficially incorporate knowledge from a given domain. Additional details of the operations are described herein.

Start by gathering domain specific data models and ontologies. These are the terminologies used to describe a business domain and the underlying data structures to get them from the data sources. The ontologies include mappings of terms (words) utilized in a particular domain to specific portions of one or more associated data sources.

The left-hand side, e.g., of the mapping, primarily consists of all the words, while the right-hand side potentially represents the mapping to the underlying data source, and specific elements in the data source. This mapping could take the form of a table or an expression applied to a table, such as calculating the sum, maximum, or average. It may refer to either a term within the data source or an expression that can be applied to the data source.

This entire system is, in essence, a comprehensive dictionary of all things. It could manifest in the form of a dictionary list, and might also include tables, which are, in this context, sub-mappings. Data source information may be ingested through this process.

When a user provides an input, e.g., "Show me sales in Agra," it raises the question of how the system can ascertain whether "Agra" actually refers to a location. The business intelligence system performs this determination through semantics. By capturing in an ontology, a dimension called 'location' and familiarity with valid values for the dimension, the ontological knowledge enables the business intelligence system to interpret a question correctly, e.g., by demonstrating an understanding that when referring to "Agra", the user is in fact referring to a location.

The process involves analyzing the terms that are utilized by users in the domain and the values present in the data source (database). This analysis might involve extracting values and interpreting them. To achieve this, comprehensive dictionaries and vocabularies are deployed in addition to smaller, more nuanced inference models. These models enable the inference of the most semantically similar meanings to the terms and fragments you use. For instance, even if the term is not explicitly 'Agra', but something similar, the inference models can enable determination of the nearest term that could potentially mean the same thing.

Extract relevant business dimensions, e.g., customers, locations, etc., and their associated metrics, e.g., revenue, churn, etc. These dimensions and metrics are how stakeholders ask questions in their business.

Dimensions and metrics could map directly from the database or could be derived via further processing. Data models capture those additional processing required to do the derivation and business questions must be answered against those domain specific data models to get the semantics correct.

Note that the system can still create additional data models for processing the business questions.

Database statistics, summaries and samples, etc., are then gathered to get an understanding of the data patterns underlying the business semantics (data models and ontologies). Database statistics are used to infer the relationships, hierarchies, and valid values domains, so that the business questions could be interpreted correctly with respect to the underlying data.

Then we use historical query workloads to learn the user patterns and assign weights to various entities for disambiguation and ranking. These weights help to make the best decisions when interpreting questions with several possible meanings.

All of the above information together constitutes the business context, and it is specific to an instance within the business domain.

The process of translating the inputs (domain models/ontologies, database statistics, and historical workloads) to business context is automated by training it on many previously seen examples.

From the business context, a set of synthetic questions and answers are generated that are relevant to the specific business instance. These are representative of both the semantics and the data for that business domain.

The business context and the synthetic question answers are provided to the AI agent for answering business questions.

Generating Synthetic Questions:
    1. Given the metadata from the ontology and database, the
        components of a question are identified, such as:
    a. Dimensions
    b. Measures c. Grouping
d. Aggregation
e. Ordering
f. Advanced analysis
2. For each component, retrieve valid values from the domain and create valid combinations of values for different components
a. A valid combination is one which has entries in the underlying database
3. Generate natural language question fragments for each of the components and their values.
4. Combine the question fragments into a full sentence question
5. Improve the grammar of the top-k questions to make them sound more natural
6. For the remaining, transmit a request to an LLM to adapt them such that they sound more natural as follows:
a. Give the manually curated top-k questions and their corresponding components as context
b. Ask LLM to make the question for a new set of components more natural
7. Note that this approach builds the synthetic questions context bottom-up, i.e., they are guaranteed to be correct.

In some implementations, a set of synthetic questions is generated offline, and a subset of the set of synthetic questions may be selected during real-time processing of natural language input received, e.g., from a user.

Figure 2B:
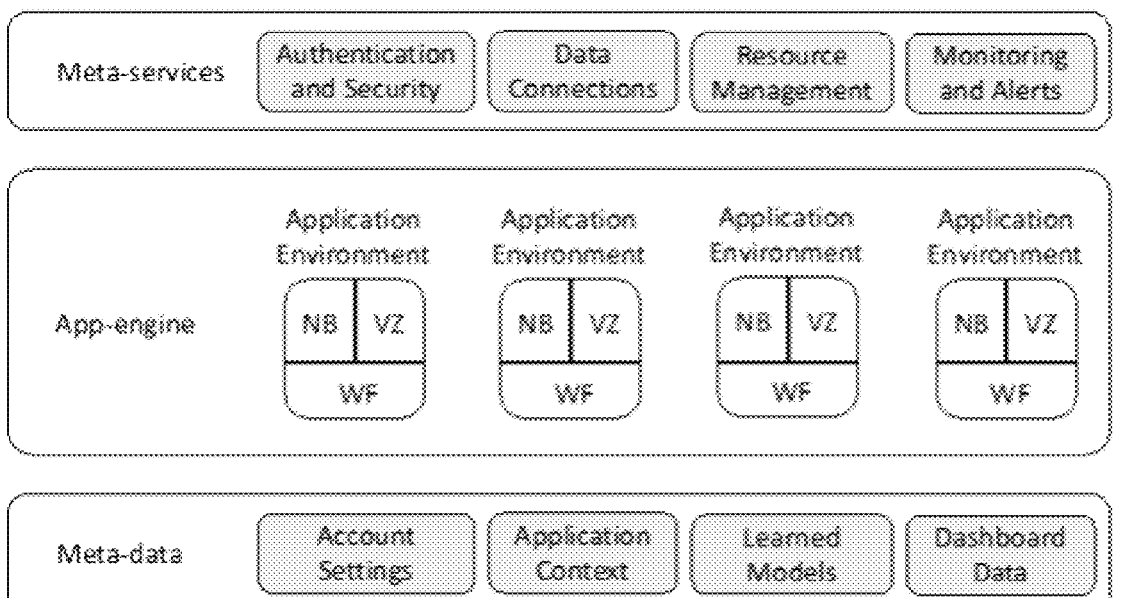
FIG. 2B illustrates an example of three layers of deployment of a business intelligence application, in accordance with some embodiments.

FIG. 2B illustrates an example of three layers of deployment of a business intelligence application, in accordance with some embodiments.

1. First, there are meta-services, including authentication and security, connections to data platforms, resource management, and monitoring and alerts.
2. Then, there is an app-engine layer consisting of one or more application environments, spun up in response to user actions or workloads.
3. Finally, there is a meta-data layer to hold things like account settings, application context, learned models, and the dashboarding data.

Meta-services are deployed as a front-end portal (each user having their own instance), while the meta-data are stored in relational and data lake storage (with each user having their own schemas and namespaces).

Application Environment

An application environment (AE) is a complete unit for app development, deployment, and backend processing. Users can create as many AEs as they want, and, depending on the user policies, the system can also spin up new AEs when workload changes. Each AE has a fixed capacity, and the system can provide AEs of multiple sizes, e.g., SMALL AE that is generally good for 50 dashboards, and LARGE AE that is generally good for 200 dashboards. Note that the AE itself does not impose any limits or restrictions. Different users can share the same AEs and there is access control for each AE. AEs are also ephemeral, i.e., they can be spun up (the AR image resides in the meta-data), shut down (all AE state or context is persisted back into the meta-data), and spun up again anytime. Each AE contains three components:

1. Notebook (NB) instance. A container, e.g., a Kubernetes container, that runs the notebook for user conversations. The NB state is persisted and could be used by other AEs concurrently.
2. Visualization (VZ) instance. A container that loads and serves a subset of dashboards (called dashboard partition). New AE instances are needed to load multiple dashboard partitions at the same time. This could be configured as a policy by the user.
3. Workflow (WF) instance. A managed Airflow environment that runs the backend workflows on the data platforms. WF instance environments are pooled across the entire user organization, i.e., a set of long running environments that are reused repeatedly.

Pay-As-You-Use

Current self-serve BI tools impose a variety of limitations such as storage size, queries or rows processed, daily refreshes, number of users, etc. These products are priced in tiers with increasing limits for one or more of these parameters. This inhibits business productivity since users need to identify their limits, make appropriate purchases, and then struggle to remain within those limits. Business intelligence 3.0 removes all such limits. There is no limit on the number of users, number of queries, rows, bytes, refreshes, etc. Instead, users can spin up as many application environments as they like and pay for only the duration for which those AEs were used. They can configure the system to auto-scale to more AEs if they want and only pay more if their scenarios and businesses grow, thus creating a level playing field for anyone doing BI.

The AI agent includes two complementary components, namely the natural language query processor and the business intelligence generator. They are described herein.

Figure 3:
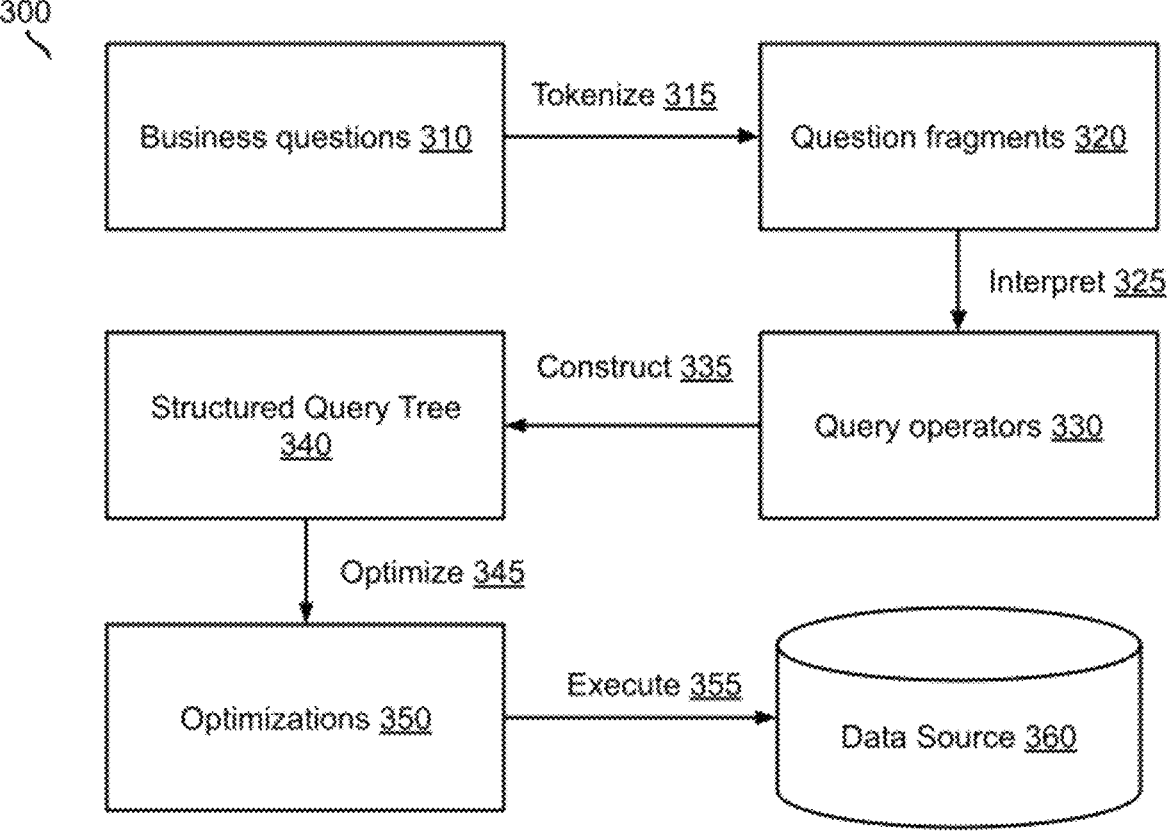
FIG. 3 depicts an example workflow to implement natural language query processing, in accordance with some embodiments.

FIG. 3 depicts an example workflow to implement natural language query processing, in accordance with some embodiments.

FIG. 3 depicts an example workflow 300 that describes how specialized generative models may be adapted to a specific domain.

Received business questions (310) are tokenized (315) to form question fragments (320). The question fragments 320 are interpreted (325) to generate query operators (330). From the query operators (330), a structured query tree (340) is constructed (335). The structured query tree (340) is optimized (345) via one or more optimizations (350) and then executed (355) on one or more data sources (360).

Natural language questions are domain questions requiring business logic, and not database questions involving files and tables. Therefore, the natural language questions are processed using the domain specific information before it could be executed on the database. The workflow below shows the various steps in an example natural language query processor. We describe each of them below.

The first step is to break the user's questions into fragments. This is done using the business context and the typical components to a question seen in that business domain. A combination of generative AI e.g., large language models (LLMS) and classical machine learning (ML) models may be utilized to fragment a question into smaller workable pieces (fragments).

Select a subset of top-k synthetic questions that are semantically most similar to the user question;

Provide these questions as inputs for the LLM to generate the query fragments

In case of ambiguity, use a probabilistic ML model to split a large fragment further or combine smaller fragments together For questions that follow previously observed (seen) patterns, a classifier ML model is utilized to map the question into likely fragments, e.g., typically seen subject and predicate clauses, or typically asked dimensions and measures.

Perform a cache storage of fragment patterns for future reuse

Ensure similarity and diversity

A next operation is to interpret each fragment into valid and meaningful query operators. This uses the synthetic questions/answers as context to understand how similar fragments are interpreted in that domain. In addition, database statistics related constraints may be imposed to ensure a valid interpretation.

The models used are a combination of classification and regression models.

The input is the question and the business context

We extract features from the question fragment, based on what terms on their lemmetizations are present in the fragment, e.g., does it talk about products, or customers, or revenue.

We rank the interpretation based on database statistics, e.g., is revenue most frequently mapped to quarterly revenue or annual revenue, does Apple refer to a product or a company in my domain, and so on.

Identifying the query processing needed to answer the question, e.g., revenue trends, or month with maximum revenue, or total sales.

Then, the operators are composed into a structured query tree for the backend database. The query is formulated against relevant data models (business specific or generated by the system). Depending on the database backend and its supported dialect, multiple query trees may be utilized to get the intended answer.

Identifying what underlying data models should be used to process a

We optimize the query tree for performance, leveraging techniques for caching and pre-computation.

And finally, we execute the structured query on the data source.

Commonly, disambiguation may need to be performed when an exact match is not identified. An example disambiguation algorithm is described herein.

1. A fragment, F, may be disambiguated into entity, dimensions, measure, or functions over them. A function could be relational, e.g., filter, aggregate, join, or a scalar expression, e.g., absolute, transpose, etc.

2. To disambiguate entities:

a. Hash-based classifiers are created over the names and value domains of all existing entities, obtained from both the ontology and the database.

b. If F matches the name of any entity E, then E is returned.

c. If F is contained in any value of an entity E's value domain, then E is returned.

d. If F matches partially with multiple entity names {E} or is contained (fully or partially) in multiple entity {E} value domain, then:

i. Compute a similarity metric, e.g., cosine similarity, between the user question and each entity name in {E}. Where the scores are denoted as {S}:

ii. Sort {S} in descending order and return the entity with the highest score.

3. To disambiguate dimensions:

a. Segregate dimension columns offline as columns that have:

i. Identifier or low cardinality description columns ii. Column having filter conditions iii. Time and other continuous columns that indicate trends b. Cluster dimension columns that are correlated into logical dimension tables i. Columns in a dimension table have a hierarchy, e.g., location dimension may have state, city, zip code, etc.

ii. A fragment to any of the column in the same dimension table is categorized in the same fragment c. Create hash-based classifiers for dimension tables, dimension columns, and their value domains. The classifier is applied to lemmatize the keywords to their base form, e.g., the word "shipped" is lemmatized to "ship"; non-informative stop words observed in history are ignored, e.g., show, what, where, etc., before training.

d. The dimensions may be inferred as follows:

i. Dimension tables are matched to determine if there is a match ii. If a match is not identified, dimension column names are matched iii. Next, dimension column name aliases are matched to terms from ontology or from query history iv. If not, try matching in dimension column value domain v. If not, use a random forest classifier trained on past query history with manual labels may be utilized e. A fragment can be disambiguated to multiple dimension tables, indicating that the tables may need to be joined in order to process the query.

4. To disambiguate measures:

a. Tokenize and create hash-based models on all measures from the ontology b. For a fragment F, identify all tokens (sequence of strings) that have a partial of full match with the hash model c. Group tokens that are overlapping, i.e., same sequence of string maps to different measures.

d. Rank measures for each group using the following features:

i. Percentage of measure that is matched, e.g., for each group ii. The Levenstein distance of the token from the measure name provides an added metric, which may be determined iii. A Poisson model of measure frequency seen in the past query history may be utilized iv. A linear regression model that fits the above features using supervised learning may be utilized e. The top ranked measure from each group is interpreted, while the others are provided to users and may serve as hints for reformulating the question.

5. To disambiguate functions:

a. Find the most similar set of data models that contain all disambiguated entities and measures and construct a join between them.

b. Use LLMs to infer the most relevant grouping of data, subject to the dimensions and measures selected.

c. Use LLMs to infer filters on one or more dimensions; all filter values must be valid with respect to the value domain.

d. Infer aggregations using semantics of the data, e.g., averages can only be averaged further, count can be summed or averaged, etc.

A fragmentation algorithm may be utilized to systematically deconstruct a query into various components and to utilize these components to generate contextually relevant and operationally accurate responses. An example fragmentation algorithm is described herein.

Identification of Query Components: The method commences with the identification of potential fragment types, herein referred to as components, inherent within a query. These components include, but are not limited to, the following:

Dimensions: This refers to the spatial or measurable aspects of the query.

Measures: This pertains to quantifiable elements within the query.

Grouping: This relates to the classification or categorization of query elements.

Aggregation: This involves the consolidation or combination of query elements.

Ordering: This is associated with the sequence or arrangement of elements within the query.

Advanced Analysis: Entailing complex interpretive or evaluative aspects of the query.

Context Retrieval for Each Component: For each identified component, the method involves retrieving context relevant to the user's query. This is achieved through the following steps:

a. Selection of Synthetic Questions: Identifying the top-k synthetic questions exhibiting the maximum cosine similarity to the user's query. The parameter k may be configurable to a particular application and/or AI agent b. Projection of Corresponding Components: Utilizing the identified synthetic questions to project corresponding components, which are then used as context.

Initial Component Generation: Subsequent to context retrieval, a Language Learning Model (LLM) is employed to generate an initial version of each component, utilizing the context obtained in the previous step.

Refinement and Operator Mapping: Each component is then refined, and corresponding fragments are mapped to actual operators, ensuring operational precision and relevance. The fragmentation method adopts a bottom-up approach, ensuring that the operators generated and employed are always correct and contextually appropriate.

Utilization of fragmentation enables a structured and efficient method for analyzing and processing queries through a fragmentation approach, ensuring accurate and contextually relevant responses.

Figure 4:
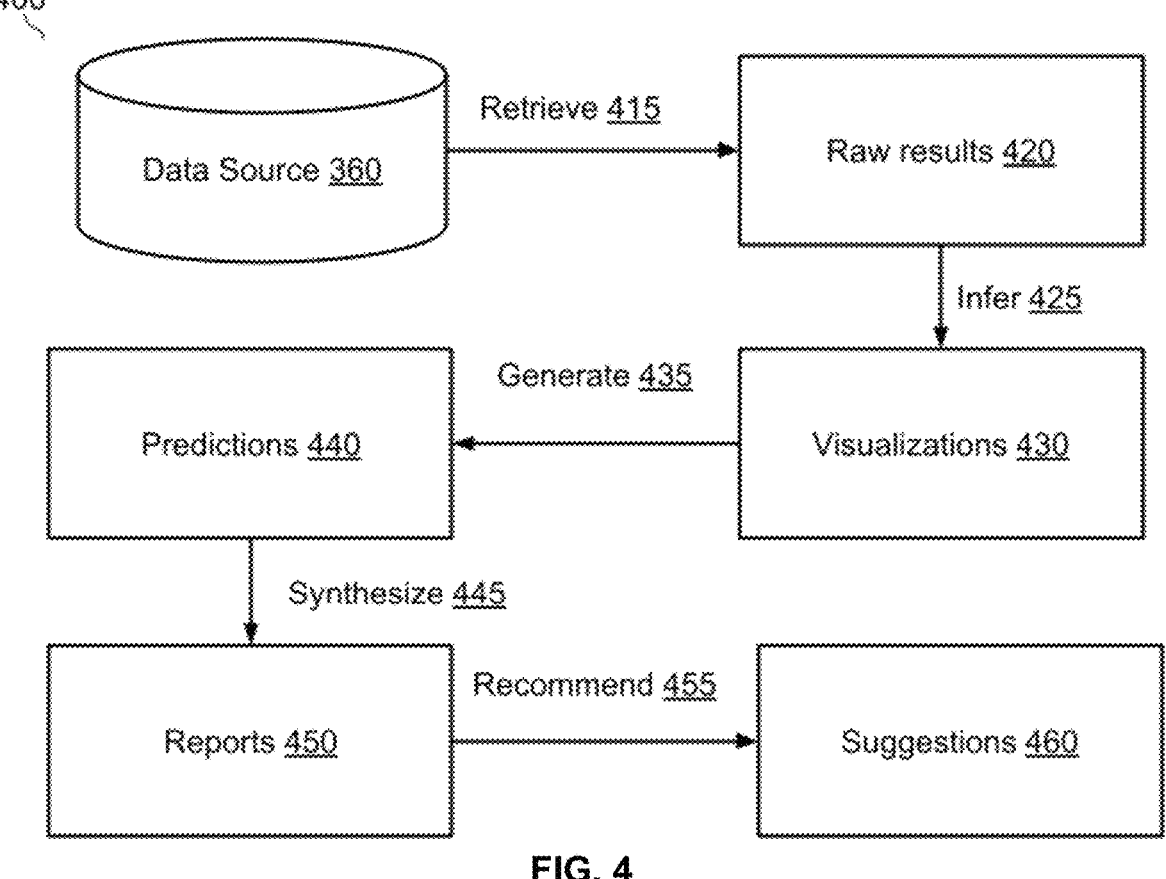
FIG. 4 depicts an example workflow to generate a response to business intelligence questions, in accordance with some embodiments.

FIG. 4 depicts an example workflow to generate a response to business intelligence questions, in accordance with some embodiments.

As depicted in FIG. 4, raw results (output results) 420 are retrieved (415) from a data source (360), e.g., as a response received to an executed query. One or more visualizations (430) may be inferred (425) based on the output results. Predictions (440) and/or forecasts may be generated (435). A set of visualizations (430) and predictions (440) may be synthesized (445) into one or more reports (450). Additionally, suggestions (460) may be recommended (455) to the user, e.g., based on observed trends, anomalies, cohort analysis, etc.

A response may be provided via multiple channels. In some implementations, a real-time response may be provided and additional material may be made available to the user for subsequent retrieval.

Raw data is retrieved directly from the data source. Note that the results are always fresh and intermediate caching or materialized views can be used to speed up the response times.

Based on the data statistics we infer the most suitable visualizations of the raw data, e.g., low cardinality data may be better suited for pie charts, or continuous values may be preferably displayed as line charts, while discrete should be bar charts, and so on. We also infer the axes and their scaling, e.g., linear vs log.

Then we generate any possible predictions, either based on the question or on the data trends. Examples include outliers, anomalies, trends, forecasting, etc. Prediction algorithms typically involve a lot of parameter tuning, but the approach described herein may enable auto-tuning of those parameters based on the similarly observed (seen) data distributions.

Can show interesting patterns, e.g., anomaly, correlations, etc.

We then synthesize data and predictions into a report. These could include additional analysis such as cohort or summarization. We present them in a readable natural language form leveraging both generative AI and classical ML models.

Finally, we make possible recommendations for taking actions or even for refining the question based on what other things that could be answered in that business domain and for that business instance.

The information generated by the business intelligence generator is presented to the user. Note that one more of the information could still be skipped/omitted depending on the user question and data/context available.

FIG. 5A depicts example elements of stored business data at a data source, in accordance with some embodiments.

As depicted in FIG. 5A, the data source includes data elements relevant to the domain/enterprise; tables that include a listing of products, customers, suppliers, transactions, and associated attributes.

FIG. 5B depicts an example business intelligence question and corresponding fragments, operators, and a structured query tree, in accordance with some embodiments.

As depicted in FIG. 5B, a question is posed by a user as a natural language string ("Show the top five parts of brand1 which has the highest sales in US in January 2023"). The natural language string is further decomposed into fragments 530 based on a large language model (LLM) and domain specific synthetic questions that are provided to the LLM for context.

Based on the fragments, query operators 540 are determined, from which a structured query tree 550 is constructed. The final result may be obtained by execution of the structured query tree (or execution of portions of the tree).

FIG. 5C depicts another example business intelligence question and corresponding fragments, operators, and a structured query tree, in accordance with some embodiments.

Figure 6:
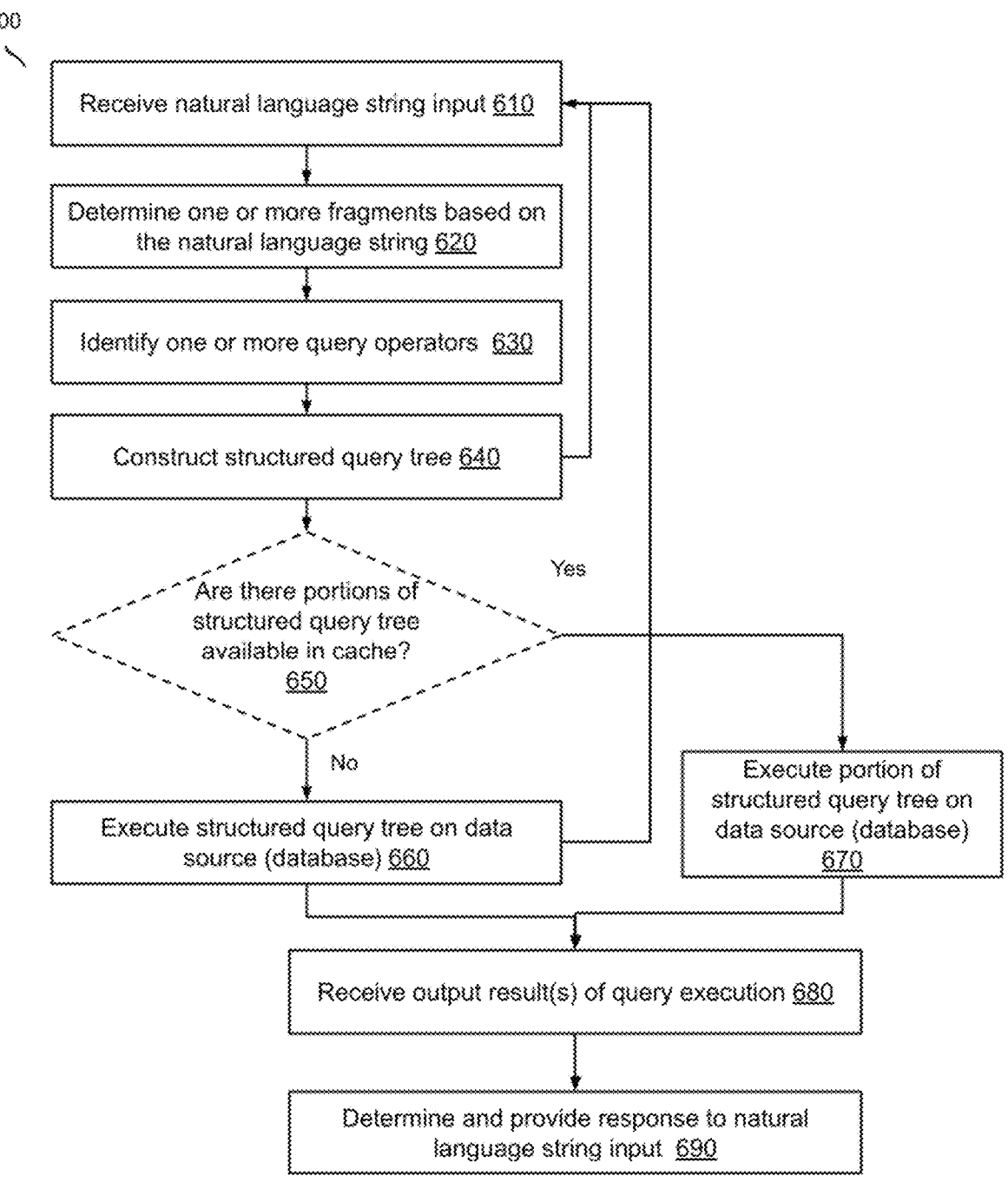
FIG. 6 depicts an example method to automatically generate a response to a business intelligence question, in accordance with some embodiments.

FIG. 6 depicts an example method to automatically generate a response to a business intelligence question, in accordance with some embodiments.

In some implementations, method 600 can be implemented, for example, on business intelligence system 110 described with reference to FIG. 1. In some implementations, some or all of the method 600 can be implemented on one or more client systems 120, on a distributed computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., receipt of a question via an application program interface (AI), reception of an event or notification, and/or messages from a cloud computing system, at a predetermined time, a predetermined time period having expired since the last performance of method 600, and/or one or more other conditions or events occurring which can be specified in settings processed by the a processor performing the method.

Method 600 may begin at block 610.

At block 610, a natural language string input is received, e.g., at a processor.

In some implementations, the natural language string input is a question posed by a user, and may be received at an artificial intelligence agent, e.g., similar to AI agent 160 described with reference to FIG. 1. In some implementations, receiving the question may include receiving the question at an artificial intelligence (AI) agent, wherein the AI agent is an instantiation of a plurality of machine learning models that are particular to a domain associated with a computing device that originated the question.

In some implementations, receiving the questions as the natural language string may include receiving an input via a voice to text converter. In some implementations, receiving the questions as the natural language string may include received text input received from a computing device of a user, wherein the user provides the natural language string input directly using the computing device.

Block 610 may be followed by block 620. At block 620, one or more fragments may be determined based on the natural language string. In some implementations, a tokenization technique may be applied to determine the one or more fragments.

In some implementations, the determination of the one or more fragments based on the natural language string may be performed as a single step process, whereas in some other implementations, the determination of the one or more fragments based on the natural language string may be performed as a multi step process.

In some implementations, determining the one or more fragments can include at least applying a large language model (language learning model or LLM) to the natural language string.

In some implementations, determining the one or more fragments can include reuse of fragments determined from (and associated with) previously received questions. For example, if a newly received question is similar (or identical) to a previously received question, previously generated fragments may be reused rather than determining corresponding fragments all over again. In some implementations, questions and corresponding fragments of frequently asked questions may be stored by the business intelligence system for efficient retrieval and reuse.

In some implementations, the one or more fragments may include overlapping fragments and/or non-overlapping fragments.

In some implementations, determining the one or more fragments may further include providing synthetic questions that are similar to the natural language string to the large language model.

In some implementations, determining the one or more fragments may further include filtering or constraining the fragments based on domain specific machine learning model (s). In some implementations, the constraints can include ontological constraints, domain specific constraints, dictionaries, inference models, mappings, etc.

In some implementations processing of the natural language string can include both exact and approximate matching techniques. Precise (exact) matching may be prioritized initially, followed by an exploration of approximate matching strategies when exact matches are unattainable. The integration of deterministic machine learning models and large language models (LLMs) in generating query operators based on natural language inputs is described herein.

Prioritization of Exact Match: Initially, the processing prioritizes exact matching. As articulated, if there exists a strict mapping between the question and the knowledge base, this exact mapping is the primary focus. If an exact match is successfully found, it is utilized; otherwise, the method may proceed to the next step.

Transition to Approximate Matching: In the absence of an exact match, the approach shifts to approximate matching. This involves a more flexible interpretation of the question, relaxing the strictness of the matching criteria. This process may be iterative, gradually adjusting the level of precision required for a match.

Employment of Synthetic Questions: The method involves the use of synthetic questions to facilitate the matching process. These questions, formulated based on the context of the input query, are posed to a large language model to mediate the generation of fragments. The LLM is tasked with interpreting these synthetic questions in a manner similar to known samples, thereby aiding in the generation of relevant query fragments.

Fragment Generation: Based on the input query, the method utilizes either a direct ontology mapping or an intermediate step involving synthetic questions. The generation of fragments is constrained, ensuring adherence to an established ontology. The ontology provides a framework for mapping, ensuring that fragments correspond to known and pre-existing categories.

Selection of Relevant Synthetic Questions: In real-time processing, from a larger set of sample synthetic questions, only the most pertinent ones are selected for analysis. This selection is based on relevance to the input query, ensuring efficient and accurate processing. The relevance may be ranked based on a similarity metric, e.g., a cosine similarity score between the question posed by the user and a set of synthetic questions.

In some implementations, a plurality of synthetic questions may be generated for respective domains based on metadata from ontology of the domains.

In some implementations, generating the plurality of synthetic questions for a particular domain comprises combining a plurality of fragments, wherein each fragment is generated based on components included in a data source associated with the particular domain.

Handling Overlapping Fragments: The method may utilize overlapping fragments. Overlapping fragments may enable addressing ambiguities within queries, and enable a more nuanced interpretation.

Enforcement of Ontological Mapping: The process ensures that all generated fragments conform to the existing ontology associated with the domain and/or data sources. In the event that the LLM provides a fragment that is not included in a respective ontology, the response is realigned to the nearest existing term within the ontology. This enforces consistency and maintains the integrity of the response relative to the available knowledge base.

The generation of fragments mediated by the domain context balances the precision of exact matching with the flexibility of approximate matching, all within the confines of a predefined ontology. The methodology employs synthetic questions and large language models to interpret and generate query fragments, ensuring relevance and accuracy in real-time processing.

Block 620 may be followed by block 630. At block 630, one or more query operators may be identified based on the one or more fragments.

In some implementations, identifying the one or more query operators may include performing feature extraction on the one or more fragments.

In some implementations, identifying the one or more query operators may include reuse of previously determined mappings of fragments to query operators.

Block 630 may be followed by block 640. At block 640, a structured query tree may be constructed (composed) based on the one or more query operators.

In some implementations, constructing the structured query tree based on the one or more query operators may include constructing the structured query tree based on a target data source and/or domain specific constraints that are provided, e.g., via one or more synthetic questions.

In some implementations, block 640 may be followed by block 650. At block 650, it is determined whether output results that correspond to a portion of the structured query tree are available to the business intelligence system. If it is determined that output results that correspond to a portion of the structured query tree are available to the business intelligence system, then block 650 may be followed by block 670, else block 650 may be followed by block 660.

At block 660, the structured query tree is executed on a data source (database). In some implementations, the data source is a large data model generated from a primary data source. Block 660 may be followed by block 680.

At block 670, a portion of the structured query tree is executed on a data source.

In some implementations, executing at least the portion of the structured query tree may include performing an optimized execution of the structured query tree. In some implementations, performing the optimized execution of the structured query tree may include determining whether portions of the structured query tree have been previously executed and wherein results from such execution are stored, e.g., in a cache or in a materialized form.

In some implementations, a freshness of previously stored output results may be determined prior to utilization. For example, it may be determined whether a portion of a structured query tree has been executed within a predetermined time frame, and has results that have been cached and that are valid. In some implementations, a first operation that is performed may be to inspect the cache, and only results that are not stored may need execution of query operators on the database. In some implementations, the query processing results are stored and associated with various fragments.

Block 670 may be followed by block 680.

At block 680, an output result may be received from the data source based on the execution of the structured query tree.

Block 680 may be followed by block 690. At block 690, a response, e.g., to the question posed initially, may be generated based on the output result. The generated response may be provided to an output device and/or channel. In some implementations, the response may be provided via multiple channels and/or devices, including via the same medium or channel that it was received from.

In some implementations, generating the response may include inferring one or more visualization elements based on the output result. In some implementations, a type of visualization element may be determined based on a cardinality of data points in the output result.

In some implementations, one or more anomalies may be detected in the output result. In some implementations, for output results that include time varying data, predictions and/or forecasts may be generated and provided to a user.

Blocks 610-690 can be performed (or repeated) in a different order than described above and/or one or more steps can be omitted. For example, in some implementations, blocks 650 may be omitted, and in some implementations, blocks 610-620 may be performed as a batch operation.

Figure 7:
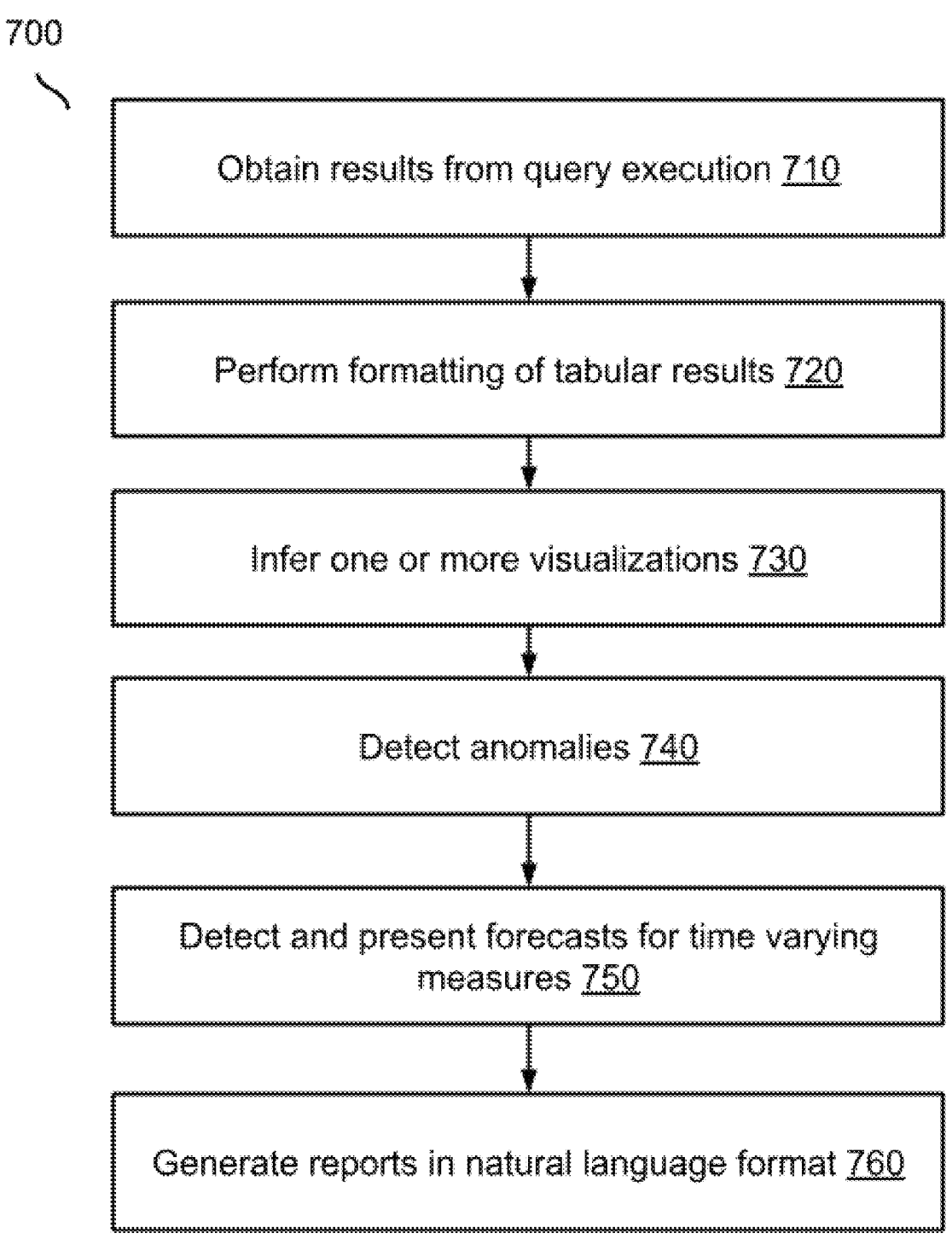
FIG. 7 depicts another example method to automatically generate a response to a business intelligence question, in accordance with some embodiments.

FIG. 7 depicts another example method to automatically generate a response to a business intelligence question, in accordance with some embodiments.

In some implementations, method 700 can be implemented, for example, on business intelligence system 110 described with reference to FIG. 1. In some implementations, some or all of the method 700 can be implemented on one or more client systems 120, on a distributed computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., receipt of output results from a data source such as a database or a file system, receipt of notifications and/or messages from a cloud computing system, at a predetermined time, a predetermined time period having expired since the last performance of method 700, and/or one or more other conditions or events occurring which can be specified in settings read by the method.

Method 700 may begin at block 710.

At block 710, output results may be obtained from a data source in response to execution of a query.

Block 710 may be followed by block 720. At block 720, any obtained tabular results are suitably formatted. For example:

a. Transpose multiple measures in rows as columns for better presentation i. This means some cells might be empty since not all measures may have values available for all dimension points.

b. Human readable headers for measures and aggregates

Block 720 may be followed by block 730. At block 730, one or more visualizations may be inferred based on the obtained output results.

a. Low cardinality and categorical data points are shown as pie chart b. Continuous time-series results are visualized as line charts c. Discrete and other results are visualized as bar chart d. Infer aspects of data values as currency, percentage, scientific notation, and human readable separators, e.g., separators for a thousandth place in a number.

e. Adjust the scaling to linear or logarithmic based on the range and variance of y-values Block 730 may be followed by block 740. At block 740, anomalies in the output results are detected. For example, a shift of data points from usually observed (normal) anchor points may be detected. In some implementations, anomalous points are detected and provided to the user along with a response, if available. In some implementations, anomaly detection may be tuned using data distributions of similarly obtained data results in the past.

Block 740 may be followed by block 750. At block 750, for questions and/or output results that include time varying data, forecasts may be determined and presented.

Block 750 may be followed by block 760. At block 760, reports may be generated, e.g., in natural language format, by applying the results to a large language model.

In some scenarios, descriptive reports may be generated for the results, summarizing them in natural language both in terms of data properties and statistics, and in terms of additional anomaly or forecasting inference.

In some scenarios, suggestions may be collected for alternate phrasing of the question, e.g., other lower ranked measures, dimensions, etc.

Blocks 710-760 can be performed (or repeated) in a different order than described above and/or one or more steps can be omitted. For example, in some implementations, any one or more of blocks 720-760 may be omitted, e.g., based on user preferences, use context, etc.

Figure 8:
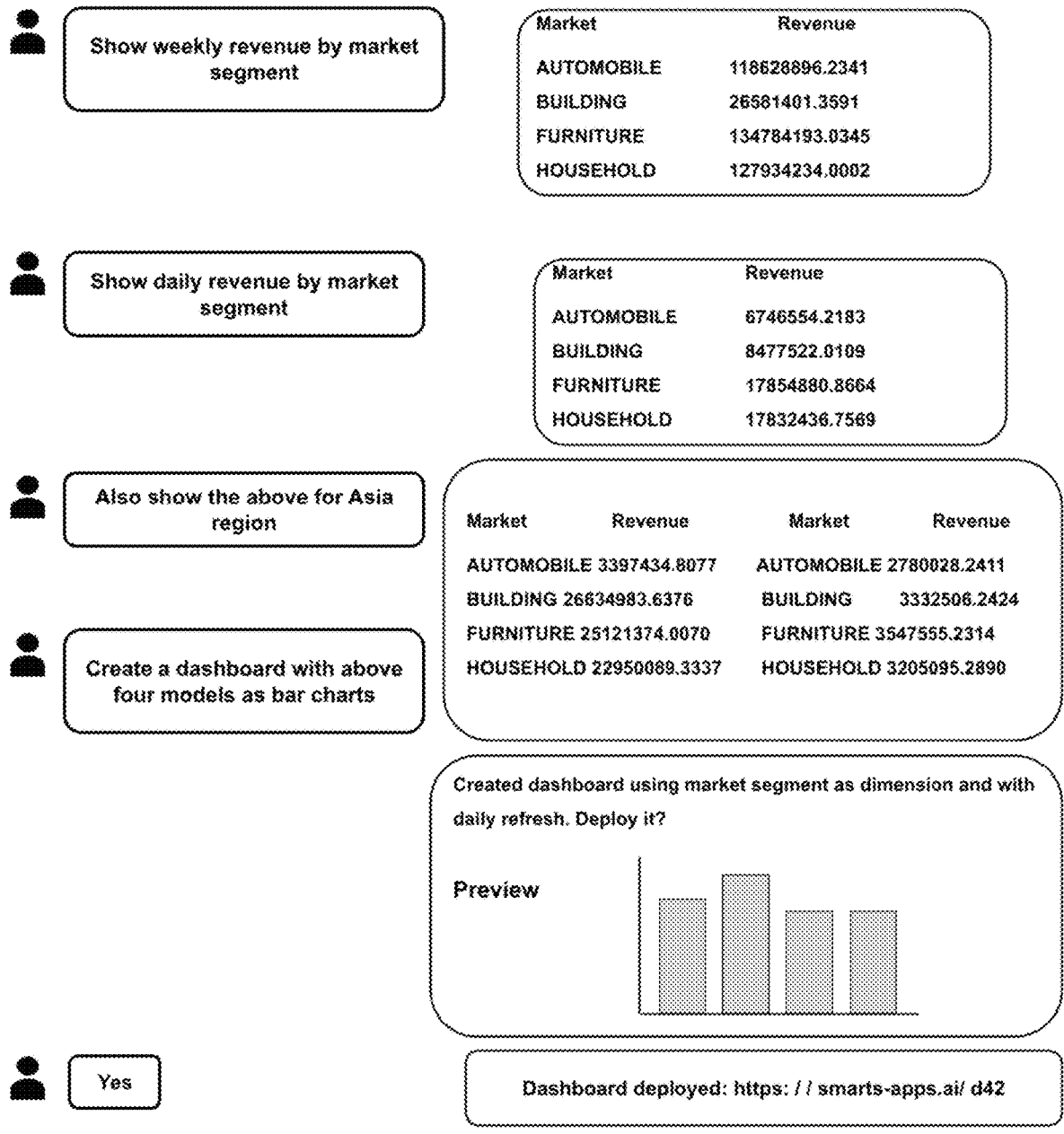
FIG. 8 depicts an example of generative actions based on user conversation, in accordance with some embodiments.

FIG. 8 depicts an example of generative actions based on user conversation, in accordance with some embodiments.

FIG. 9 depicts example code generation, in accordance with some embodiments.

Figure 10:
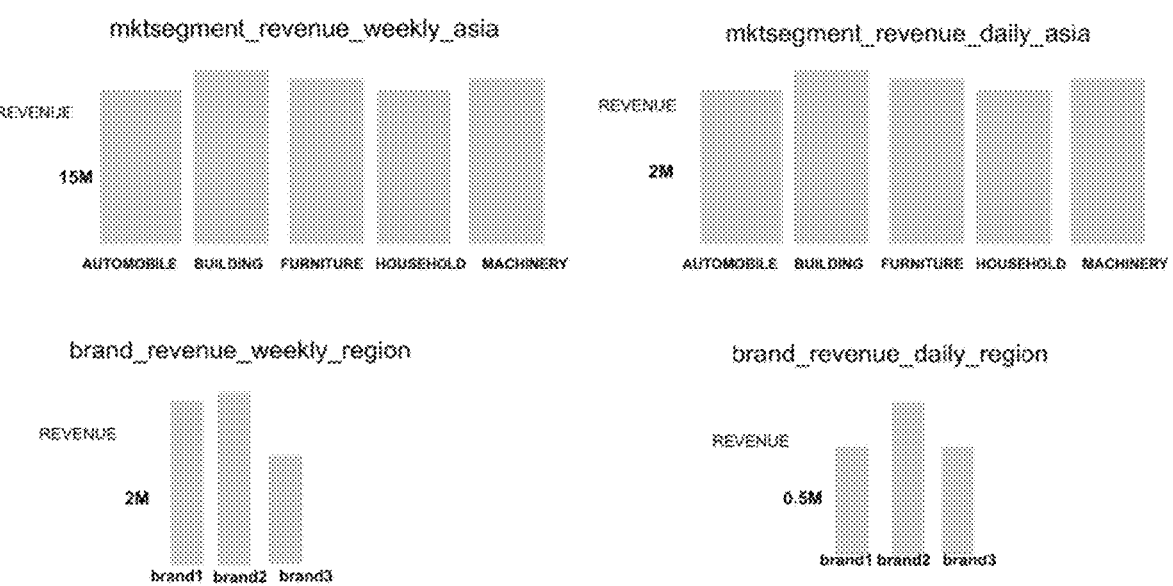
FIG. 10 depicts example dashboards, in accordance with some embodiments.

FIG. 10 depicts example dashboards, in accordance with some embodiments.

Figure 11:
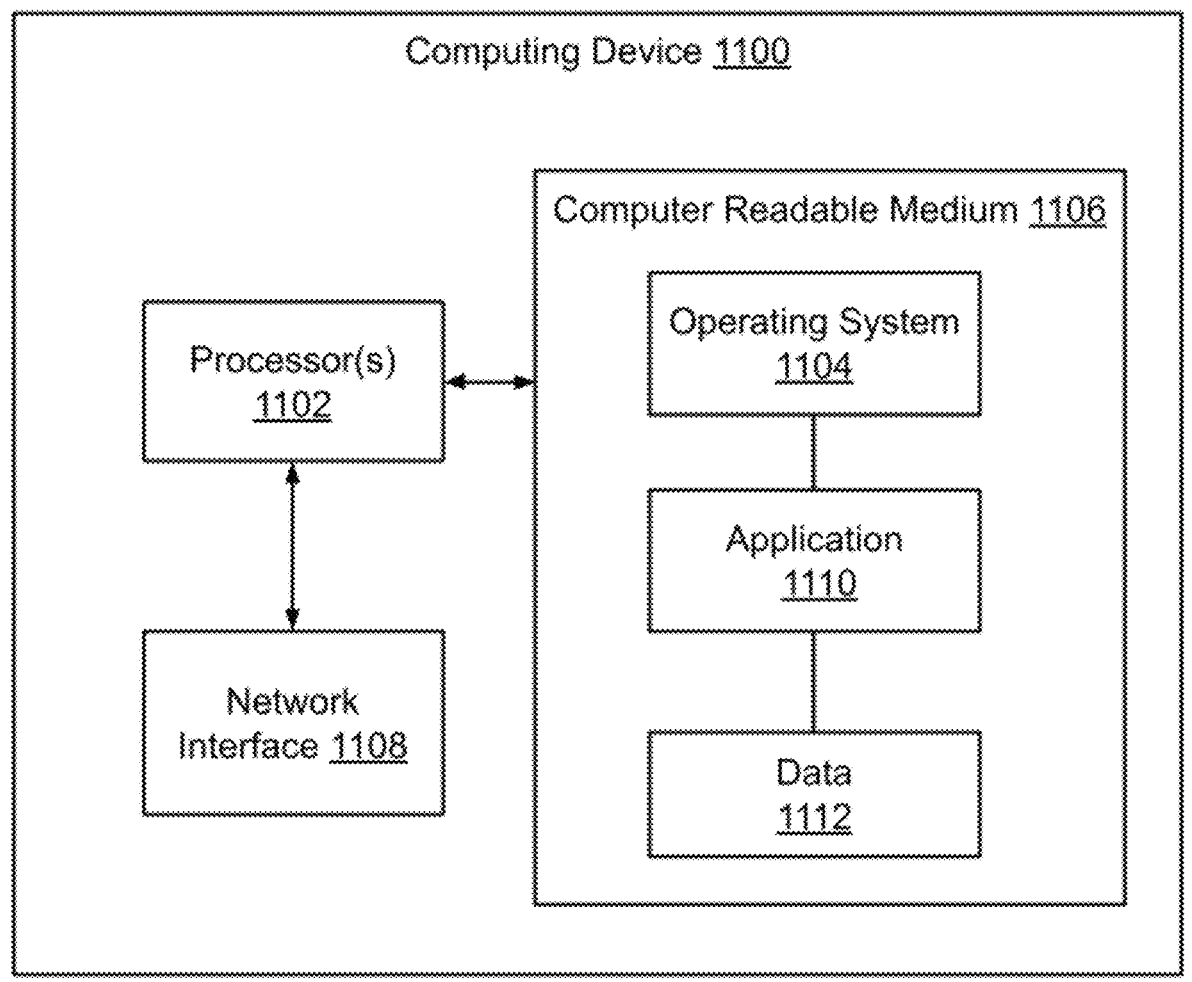
FIG. 11 depicts an example computing device, in accordance with some embodiments.

FIG. 11 depicts an example computing device, in accordance with some embodiments.

FIG. 11 is a block diagram of an example computing device 1100 which may be used to implement one or more features described herein. In one example, device 1100 may be used to implement a computer device (e.g. 110, 120, 130, and/or 150 of FIG. 1), and perform appropriate method implementations described herein. Computing device 1100 can be any suitable computer system, server, or other electronic or hardware device. For example, the computing device 1100 can be a compute resource on a cloud, a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1100 includes a processor 1102, a memory or computer readable medium 1106, and network (input/output (I/O)) interface 1108.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1106 is typically provided in device 1100 for access by the processor 1102, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1106 can store software operating on the device 1100 by the processor 1102, including an operating system 1104, one or more applications 1110 and application data 1112. In some implementations, application 1110 can include instructions that enable processor 1102 to perform the functions (or control the functions of) described herein.

Elements of software in memory 1106 can alternatively be stored on any other suitable storage location or computer-readable medium. In addition, memory 1106 (and/or other connected storage device(s)) can store instructions and data used in the features described herein. Memory 1106 and any other type of storage (magnetic disk, optical disk, magnetic tape, or other tangible media) can be considered "storage" or "storage devices."

A network or I/O interface can provide functions to enable interfacing the server device 1100 with other systems and devices. For example, network communication devices, storage devices, and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 11 shows a single representation (block) of processor 1102 and memory 1106. These blocks may represent one or more processors or processing circuitries, operating systems, memories, I/O interfaces, applications, and/or software engines. In other implementations, device 1100 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1100, e.g., processor(s) 1102, memory 1106, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices. In another example, all computations can be performed on a distributed computing system, e.g., a cloud based computing system.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to generate a response to a business intelligence question received from a user, comprising:

receiving the question as a natural language string;

obtaining a plurality of previously generated synthetic questions that corresponds to a domain associated with a computing device that originated the question from the user;

determining a subset of the previously generated synthetic questions that are semantically similar to the natural language string;

determining one or more fragments based on the natural language string by providing the subset of the previously generated synthetic questions that are semantically similar to the natural language string, question fragments corresponding to the subset of the previously generated synthetic questions, and the natural language string to a large language model, wherein the subset of the previously generated synthetic questions that are semantically similar to the natural language string and the question fragments are utilized by the large language model to constrain the determination of the one or more fragments based on the natural language string;

identifying one or more query operators based on the one or more fragments, wherein the identifying the one or more query operators comprises identifying a plurality of query components in the fragments, wherein the plurality of query components comprises one or more of: dimensions, measures, grouping, aggregation, ordering, advanced analysis, and combinations thereof;

constructing a structured query tree based on the one or more query operators;

executing at least a portion of the structured query tree on a data source, wherein the data source comprises one or more of a database, a data warehouse, an object store, and combinations thereof;

receiving, from the data source, an output result based on the execution;

generating the response based on the output result; and providing the response to the user.

2. The computer-implemented method of claim 1, wherein determining the one or more fragments comprises determining a combination of overlapping and non-overlapping fragments based on the natural language string.

3. The computer-implemented method of claim 1, wherein determining the subset of the previously generated synthetic questions that are semantically similar to the natural language string comprises determining a cosine similarity score between the natural language string and the plurality of previously generated synthetic questions.

4. The computer-implemented method of claim 1, wherein identifying the one or more query operators comprises performing feature extraction on the one or more fragments.

5. The computer-implemented method of claim 1, wherein constructing the structured query tree based on the one or more query operators comprises constructing the structured query tree based on one or more of a target data source and an ontology.

6. The computer-implemented method of claim 1, wherein executing at least the portion of the structured query tree comprises performing an optimized execution of the structured query tree that includes determining whether portions of the structured query tree have been previously executed.

7. The computer-implemented method of claim 1, wherein the data source is a large data model generated from a primary data source.

8. The computer-implemented method of claim 1, wherein the receiving the question comprises receiving the question at an artificial intelligence (AI) agent, wherein the AI agent is an instantiation of a plurality of machine learning models that are particular to a domain associated with a computing device that originated the question.

9. The computer-implemented method of claim 1, wherein receiving the questions as the natural language string comprises receiving an input via a voice to text converter.

10. The computer-implemented method of claim 1, wherein generating the response comprises inferring one or more visualization elements based on the output result.

11. The computer-implemented method of claim 10, wherein a type of visualization element is based on a cardinality of data points in the output result.

12. The computer-implemented method of claim 10, further comprising detecting one or more anomalies in the output result.

13. The computer-implemented method of claim 1, further comprising generating the plurality of previously generated synthetic questions for respective domains based on metadata from ontology of the domains.

14. The computer-implemented method of claim 13, wherein generating the plurality of previously generated synthetic questions for a particular domain comprises:

identifying the plurality of query components in the data source based on the metadata;

retrieving valid values for each of the plurality of query components in the data source;

generating the question fragments for each of the plurality of query components; and combining the question fragments to generate the plurality of previously generated synthetic questions.

15. A non-transitory computer-readable medium comprising instructions that, responsive to execution by a processing device, causes the processing device to perform operations comprising:

receiving a question as a natural language string;

obtaining a plurality of previously generated synthetic questions that corresponds to a domain associated with a computing device that originated the question from the user;

determining a subset of the previously generated synthetic questions that are semantically similar to the natural language string;

determining one or more fragments based on the natural language string by providing the subset of the previously generated synthetic questions that are semantically similar to the natural language string, question fragments corresponding to the subset of the previously generated synthetic questions, and the natural language string to a large language model, wherein the subset of the previously generated synthetic questions that are semantically similar to the natural language string and the question fragments are utilized by the large language model to constrain the determination of the one or more fragments based on the natural language string;

identifying one or more query operators based on the one or more fragments, wherein the identifying the one or more query operators comprises identifying a plurality of query components in the fragments, wherein the plurality of query components comprises one or more of: dimensions, measures, grouping, aggregation, ordering, advanced analysis, and combinations thereof;

constructing a structured query tree based on the one or more query operators;

executing at least a portion of the structured query tree on a data source, wherein the data source comprises one or more of a database, a data warehouse, an object store, and combinations thereof;

receiving, from the data source, an output result based on the execution;

generating a response based on the output result; and providing the response to a user.

16. The non-transitory computer-readable medium of claim 15, wherein determining the one or more fragments comprises determining a combination of overlapping and non-overlapping fragments based on the natural language string.

17. The non-transitory computer-readable medium of claim 15, wherein determining the subset of the previously generated synthetic questions that are semantically similar to the natural language string comprises determining a cosine similarity score between the natural language string and the plurality of previously generated synthetic questions.

18. A system comprising:

a memory with instructions stored thereon; and a processing device, coupled to the memory, the processing device configured to access the memory and execute the instructions, wherein the instructions cause the processing device to perform operations including:

receiving a question as a natural language string;

obtaining a plurality of previously generated synthetic questions that corresponds to a domain associated with a computing device that originated the question from the user;

determining a subset of the previously generated synthetic questions that are semantically similar to the natural language string;

determining one or more fragments based on the natural language string by providing the subset of the previously generated synthetic questions that are semantically similar to the natural language string, question fragments corresponding to the subset of the previously generated synthetic questions, and the natural language string to a large language model, wherein the subset of the previously generated synthetic questions that are semantically similar to the natural language string and the question fragments are utilized by the large language model to constrain the determination of the one or more fragments based on the natural language string;

identifying one or more query operators based on the one or more fragments, wherein the identifying the one or more query operators comprises identifying a plurality of query components in the fragments, wherein the plurality of query components comprises one or more of: dimensions, measures, grouping, aggregation, ordering, advanced analysis, and combinations thereof;

constructing a structured query tree based on the one or more query operators;

executing at least a portion of the structured query tree on a data source, wherein the data source comprises one or more of a database, a data warehouse, an object store, and combinations thereof;

receiving, from the data source, an output result based on the execution;

generating a response based on the output result; and providing the response to a user.

19. The system of claim 18, wherein the receiving the question comprises receiving the question at an artificial intelligence (AI) agent, wherein the AI agent is an instantiation of a plurality of machine learning models that are particular to a domain associated with a computing device that originated the question.

20. The system of claim 18, wherein identifying the one or more query operators comprises performing feature extraction on the one or more fragments.

\* \* \* \* \*